(12) United States Patent
Yoshida et al.

(10) Patent No.: US 7,281,639 B2
(45) Date of Patent: Oct. 16, 2007

(54) FUEL CAP

(75) Inventors: Hiromitsu Yoshida, Soja (JP); Takami Ono, Soja (JP)

(73) Assignee: Asteer Co., Ltd., Okayama (JP)

( * ) Notice: Subject to any disclaimer, the term of this patent is extended or adjusted under 35 U.S.C. 154(b) by 605 days.

(21) Appl. No.: 10/884,093

(22) Filed: Jul. 2, 2004

(65) Prior Publication Data
US 2005/0011896 A1    Jan. 20, 2005

(30) Foreign Application Priority Data
Jul. 18, 2003    (JP)    ............... 2003-276675

(51) Int. Cl.
*B65D 53/00*    (2006.01)

(52) U.S. Cl. ............ 220/304; 220/288; 220/293; 220/295; 220/296; 220/298; 220/378; 220/DIG. 33

(58) Field of Classification Search ........ 220/304, 220/378, DIG. 32, DIG. 33, 293, 295, 296, 220/298, 288
See application file for complete search history.

(56) References Cited

U.S. PATENT DOCUMENTS

| | | | | |
|---|---|---|---|---|
| 2,720,999 A | * | 10/1955 | Gamundi et al. | 220/246 |
| 2,740,548 A | * | 4/1956 | Schultz et al. | 220/238 |
| 3,006,499 A | * | 10/1961 | Corbett | 220/293 |
| 3,724,707 A | * | 4/1973 | Burgess | 220/203.26 |
| 3,985,260 A | * | 10/1976 | Evans | 220/203.21 |
| 4,540,103 A | * | 9/1985 | Kasugai et al. | 220/203.23 |
| 4,676,390 A | * | 6/1987 | Harris | 220/203.06 |
| 4,887,733 A | * | 12/1989 | Harris | 220/203.06 |
| 5,108,001 A | * | 4/1992 | Harris | 220/203.06 |
| 5,381,919 A | * | 1/1995 | Griffin et al. | 220/326 |
| 5,385,256 A | * | 1/1995 | Brown | 220/323 |
| 5,395,004 A | * | 3/1995 | Griffin et al. | 220/295 |
| 5,480,055 A | * | 1/1996 | Harris et al. | 220/203.26 |
| 5,791,507 A | * | 8/1998 | Harris et al. | 220/203.26 |
| 6,209,745 B1 | * | 4/2001 | Jansson | 220/288 |
| 6,213,331 B1 | * | 4/2001 | Morgan et al. | 220/295 |
| 6,286,704 B1 | * | 9/2001 | Harris | 220/304 |
| 6,755,316 B2 | * | 6/2004 | Ono et al. | 220/304 |
| 2004/0026424 A1 | * | 2/2004 | Reustle et al. | 220/378 |

FOREIGN PATENT DOCUMENTS

| | | |
|---|---|---|
| JP | 2712115 | 10/1997 |
| JP | 9-512770 | 12/1997 |
| JP | 2002-293356 | 10/2002 |

* cited by examiner

*Primary Examiner*—J. Allen Shriver
*Assistant Examiner*—Robert J Hicks
(74) *Attorney, Agent, or Firm*—Koda & Androlia

(57) ABSTRACT

The present invention provides a fuel cap having a high operability while maintaining the air-tightness thereof at a necessary and sufficient level. The closure includes a closure body having a head portion, a trunk portion and an annular trunk surface having stopper projections; a seal ring; a sleeve; a coiled spring; and an engagement member having engagement projections. The fuel cap is formed by assembling the seal ring around the annular surface of the trunk portion of the closure body and the sleeve with the trunk portion in the mentioned order, interposing the coiled spring between the sleeve and engagement member, and connecting the engagement member to the trunk portion of the closure body.

18 Claims, 27 Drawing Sheets

FUEL CAP

BACKGROUND OF THE INVENTION

1. Field of the Invention

The present invention relates to a fuel cap for a fuel tank for a motor vehicle.

2. Description of the Related Art

Although a fuel cap for a fuel tank for a motor vehicle is a simple part, it is important to maintain the high airtightness function of the cap with respect to an oil filler port in a stage in which the fuel cap is turned in the closing direction with respect to an oil filler port and thereby completely finished the securing operation. This stage is hereinafter referred to as a "securing-finished" stage. The improvement of the operability of the fuel cap turning operation from a stage in which the fuel cap is inserted into the fuel filler port and started being turned in the closing direction (, and this stage is hereinafter refereed to as a "securing-started" stage,) to the securing-finished stage, i.e. the simplification of the fuel cap opening and closing operations and, especially, the reduction of the torque needed to turn the fuel cap in the closing direction are demanded.

The conventional fuel caps produced with the attention paid to the improvement of the operability thereof can include the fuel caps disclosed in, for example, Japanese Patent No. 2712115 and JP-T-09-512770. The fuel cap disclosed in Japanese Patent No. 2712115 compresses a seal ring owing to an operation of a cam mechanism urged downward by a spring in a final stage of an operation for securing the fuel cap to the oil filler port, and thereby attains the air-tightness of the fuel cap. The quantity of turn of the fuel cap needed to operate the cam mechanism may be small, and a turning operation for compressing the seal ring is not necessary. Therefore, it can be said that the operability of the fuel cap is improved.

The fuel cap disclosed in JP-T-09-512770 is also formed identically with that disclosed in Japanese Patent No. 2712115. The fuel cap disclosed in this patent is tightened on the oil filler port by a small quantity of turn (⅛ turn) thereof. However, when the fuel cap receives an external force, such as an impact force, there is a fear of coming off of the fuel cap from the oil filler port. In order to eliminate this inconvenience, a structure for turning idly a handle of the fuel cap engaged with the oil filler cap is added. Although an excessive turning operation corresponding to the idle turn of the handle comes to be needed to remove the fuel cap from the oil filler port but, in spite of this, a fuel cap turning operation of as large as one turn is not needed. Therefore, it can be said that the operability of the fuel cap is still excellent.

In the fuel caps disclosed in Japanese Patent No. 2712115 and JP-T-09-512770, the air-tightness thereof is attained by vertically compressing the seal ring in contact with an end of the oil filler port. Reversely speaking, it means that the air-tightness of the fuel cap cannot be secured unless the seal ring is uniformly in contact with the end of the oil filler port. Therefore, a structure capable of securing the air-tightness of the fuel cap even when the fuel cap is in a twisted positional relation with respect to the oil filler port is necessarily demanded. Concerning this point, in the fuel cap disclosed in JP-A-2002-293356, inclination preventing ribs are provided so that the twisting of the fuel cap itself does not occur. Thus, a decrease in the air-tightness of the fuel cap ascribed to the ununiform compression of the seal ring is prevented.

SUMMARY OF THE INVENTION

Although the fuel caps disclosed in Japanese Patent No. 2712115 or JP-T-09-512770 are excellent concerning the improvement of the operability thereof, the problems as will be described below can be pointed out. First, the compression of the seal ring is carried out not directly by a resiliency of a spring but strictly depends upon a quantity of the lowering of a flange operatively connected to the cam mechanism. Therefore, it is necessary that the positional relation of the flange and the dimensional accuracy of each part determining this positional relation be set high, and this poses a problem of rendering the quality control difficult.

Secondly, a load transmitted to the seal ring via the flange merely contributes to the occurrence of compression deformation of the seal ring in view of the direct effect of the load, and does not work so as to press the seal ring against a seal surface (end of the oil filler port) for the attainment of the air-tightness of the fuel cap. The seal ring is usually formed out of an elastic material, such as nitrile rubber having an oil resistance but the dimensions and physical characteristics or chemical characteristics of such a seal ring varies due to the environmental conditions and the deterioration of the seal ring with the lapse of time. It is difficult to obtain the necessary and satisfactory air-tightness of the fuel cap by such an indirect operation of the load on the seal ring. It can be said that these first and second problems are the problems of a structure for attaining the air-tightness of the fuel cap, the operability of which has been improved, with respect to the oil filler port.

The practical effectiveness of the twist preventing structure provided by the invention disclosed in JP-A-2002-293356 is scarce unless the dimensional accuracy of the inclination preventing ribs is severely set. Therefore, there is the possibility that, if the inclination preventing ribs should be broken, the problem of the twisting of the seal ring be actualized at a stroke since the measures to prevent the twisting of the seal ring are not originally taken. Under the circumstances, the development of a fuel cap having such a high operability as is seen in the fuel caps disclosed in Japanese Patent No. 2712115 and JP-T-09-512770, capable of attaining an easy quality controlling operation, not influenced by the twisting of the seal ring, and capable of securing a necessary and satisfactory air-tightness of the fuel cap was discussed.

On the basis of the results of the discussion, a fuel cap was developed which includes a closure secured to an oil filler port attached to an inlet of a feed oil pipe, and a handle for turning the closure, the oil filler port being provided on an inner side surface thereof with a plurality of intermittent circumferentially extending ribs, the closure being provided with a closure body having a head portion to be turned, a trunk portion extending downward from the head portion, and an annular trunk surface with downwardly extending stopper projections being formed on a side surface of the trunk portion, a seal ring which is fitted around the trunk portion so that the seal ring is fitted between a lower surface of the head portion and an upper portion of the annular trunk surface, and which pressure-contacts with an inner side surface of the oil filler port in radius direction from an inner side of the ring, a sleeve with annular shape having on an inner side surface thereof an annular sleeve surface provided with stopper recesses into which the stopper projections are fitted from the top, and on an outer side surface thereof downwardly extending anti-rotation projections fitted in the clearances between the ribs, and adapted to lift up the seal ring, a coiled spring urging the sleeve upward, and an engagement member having engagement projections adapted to be turned through the clearances between the ribs of the oil filler port and thereby engaged with the ribs from a lower side thereof.

The head portion of the closure body of this fuel cap may be a multi-step head portion including a head top, an upper step of the head portion and a lower step of the head portion. The fuel cap is formed by assembling the seal ring and the sleeve in the mentioned order around the trunk portion of the closure body so as to oppose the upper surface of the sleeve and the lower head portion surface of the closure body with the seal ring held therebetween, interposing the coiled spring between the lower surface of the sleeve and the upper surface of the engagement member, and thereby connecting the engagement member to the trunk portion of the closure body. As a result, the parts are combined into a unitary structure.

Owing to this structure, a fuel cap can be provided which is adapted to press the sleeve upward by a force of the coiled spring when the stopper projections fit into the stopper recesses, and hold the seal ring tightly by the upper surface of the sleeve and the lower surface of the head portion of the closure body; and press down the sleeve against the force of the coiled spring when the stopper projections disengage from the stopper recesses and run on the annular sleeve surface, and loosen the holding of the seal ring by the upper surface of the sleeve and the lower surface of the head portion of the closure body. In such a fuel cap according to the present invention, the engagement projections of the engagement member are engaged from the lower side with the ribs provided on the inner side surface of the oil filler port, so that this fuel cap has the advantage of not coming off therefrom easily even by an external force.

In this fuel cap according to the present invention, the stopper projections and stopper recesses are engaged with and disengaged from each other by turning the closure body with respect to the sleeve fixed in the turning direction with the anti-rotation projections held in the clearances between the ribs in the oil filler port. Owing to this structure, the tight holding of the seal ring by the upper surface of the sleeve and the lower surface of the head portion of the closure body and the intercepting of the influence of the deformation and friction of the seal ring upon the closure body, which occur during a turning operation of the closure body, are switched from one to the other selectively. This switching operation is practically carried out by fitting the stopper projections into the stopper recesses so as to generate a force of the coiled spring, by which the sleeve is lifted, and thereby holding the seal ring tightly by the upper surface of the sleeve and the lower surface of the head portion of the closure body; and disengaging the stopper projections from the stopper recesses to cause the stopper projections to run on the annular sleeve surface, and then the sleeve to be pressed down against the force of the coiled spring, and thereby loosening the holding of the seal ring between the upper surface of the sleeve and the lower surface of the head portion of the closure body. A flat spring can be used as the elastic member as long as the coiled spring and the flat spring are members generating resilience in the direction (vertical direction) in which the members are connected together.

In the fuel cap according to the present invention, the stopper projections and the stopper recesses are thus disengaged from each other while in proceeding from the securing-started stage to the securing-finished stage. Namely, when the stopper projections run on the annular sleeve surface to cause the holding of the seal ring to be loosened, the bad influence of the deformation and friction of the seal ring, which occur during a fuel cap turning operation, upon the closure body is intercepted, and the torque needed to carry out a fuel cap turning operation can be reduced.

The sleeve in this fuel cap is provided with the stopper recesses in the circumferential positions corresponding to the securing-started stage and the securing-finished stage. The engagement member is provided with the engagement projections on the outer side face thereof in the circumferential positions corresponding to the securing-started stage. The holding of the seal ring is attained by fitting the stopper projections into the stopper recesses in the securing-started stage and the securing-finished stage of the fuel cap, urging the coiled spring so as to lift the sleeve, and thereby tightly holding the seal ring between the upper surface of the sleeve and the lower surface of the head portion of the closure body. Conversely, the loosening of the holding of the seal ring may be attained by disengaging the stopper projections from the stopper recesses while in proceeding from the securing-started stage to the securing-finished stage to cause the stopper projections to run on the sleeve annular surface, and thereby pressing down the sleeve against the force of the coiled spring.

In order to reliably carry out a fuel cap turning operation in the closing direction, it is recommended that the annular sleeve surface be inclined downward from the stopper recesses provided in the circumferential positions corresponding to the securing-started stage toward the stopper recesses provided in the circumferential positions corresponding to the securing-finished stage. When the stopper projections are disengaged from the stopper recesses provided in the circumferential positions corresponding to the securing-started stage to run on the annular sleeve surface, the stopper projections are moved smoothly toward the stopper recesses provided in the circumferential positions corresponding to the securing-finished stage along the downwardly inclining annular sleeve surface. This enables the fuel cap turning operation in the closing direction from the securing-started stage to the securing-finished stage to be carried out easily and reliably.

Conversely, in order to easily carry out the fuel cap turning operation in the fuel cap opening direction, it is recommended that the annular sleeve surface be inclined downward from the stopper recesses provided in the circumferential positions corresponding to the securing-finished stage toward the stopper recesses provided in the circumferential positions corresponding to the securing-started stage. When the stopper projections are disengaged from the stopper recesses provided in the circumferential positions corresponding to the securing-finished stage to run on the annular sleeve surface, the stopper projections are moved smoothly toward the stopper recesses provided in the circumferential positions corresponding to the securing-started stage along the downwardly inclined annular sleeve surface. This enables the fuel cap turning operation in the opening direction thereof from the securing-finished stage to the securing-started stage to be carried out easily and reliably.

The stopper recesses provided in the circumferential positions corresponding to the securing-started stage and the stopper recesses provided in the circumferential positions corresponding to the securing-finished stage allow the sleeve to be lifted in the same manner by the coiled spring owing to the engagement of the stopper projections and stopper recesses with each other. However, strictly speaking, it is desirable that the stopper projections be made able to disengage easily from the stopper recesses provided in the circumferential positions corresponding to the securing-started stage, and, conversely, fit sufficiently in and rarely come off from the stopper recesses provided in the circumferential positions corresponding to the securing-finished stage.

Therefore, in the sleeve, the depth of the stopper recesses provided in the circumferential positions corresponding to the securing-started stage may be set relatively small, while the depth of the stopper recesses provided in the circumferential positions corresponding to the securing-finished stage may be set relatively large. As a result, the stopper projections are easily disengaged from the stopper recesses provided in the circumferential positions corresponding to the securing-started stage, against the force of the coiled spring, while the stopper projections as a whole fit in the stopper recesses provided in the circumferential positions corresponding to the securing-finished stage with the sleeve lifted without obstructing the force of the coiled spring to thereby enable the seal ring to be held tightly by the upper surface of the sleeve and the lower surface of the head portion of the closure body.

Thus, the fuel cap according to the present invention lessens the torque needed to carry out a turning operation therefor and improves the operability thereof by releasing the closure body from the influence of the seal ring. This can be attained because the seal ring used in the present invention provides the air-tightness not owing to the compression of the seal ring by the head portion of the closure body but owing to the pressure-contact of the seal ring with the inner side surface of the oil filler port in radius direction from the center thereof, so that, even when the closure body is released from the influence of the seal ring, problems do not occur from the securing-started stage to the securing-finished stage. Namely, in the fuel cap according to the present invention, the turning operation of the closure body does not basically have relation with the air-tightness of the fuel cap attained by the seal ring. Since the highness and lowness of the air-tightness is determined strictly by only the positional relation between the seal ring and the inner side surface of the oil filler port, the turning operation of the closure body and the air-tightness of the fuel cap owing to the seal ring can be separated from each other.

Since the seal ring pressure-contacted with the inner side surface of the oil filler port in radius direction from the center thereof can display the air-tightness of the fuel cap as long as the seal ring is positioned in the oil filler port, the seal ring has the advantage of not causing the air-tightness of the fuel cap to decrease even with respect to the twisting thereof. Furthermore, the seal ring is pressure-contacted with the inner side surface of the oil filler port by a restoring force occurring due to the elastic deformation thereof, so that the seal ring also has as compared with a compression-deformed seal ring the advantage of having not lower than a predetermined level of air-tightness display even when the dimension control is relaxed.

The seal ring in the present invention may be made of a well-known cross-sectional circular seal ring. However, in order to attain a compatibility of the deformation of the seal ring needed to display the air-tightness of the fuel cap by pressure-contacting the seal ring with the inner side surface of the oil filler port in radius direction from the center thereof and the stable holding of the seal ring by the upper surface of the sleeve and the lower surface of the head portion of the closure body, a more preferable structure is conceivable. A preferable seal ring in the present invention includes an upper annular edge fitted firmly around a trunk portion of a closure body, a lower annular edge diverging from the upper annular edge, and a frustum seal surface connecting the upper annular edge and lower annular edge together and inclined downward in the outward radius direction. In this structure, the upper annular edge is held between the upper surface of the sleeve and the head portion of the closure body from the upper and lower sides thereof, and the outer circumferential surface of the lower annular edge is pressure-contacted with the inner side surface of the oil filler port in radius direction from the center thereof.

This seal ring attains by the frustum seal surface the deformation thereof needed to obtain the air-tightness of the fuel cap, and pressure-contacts the outer circumferential surface of the lower annular edge with the inner side surface of the oil filler port by utilizing the restoring force of the frustum seal surface which is deformed with the upper annular edge used as a fulcrum which is held by the upper surface of the sleeve and the head portion of the closure body. The downward inclination of the frustum seal surface sets the direction of deformation of the seal ring used the upper annular edge thereof as a fulcrum in the inward radius direction and in the direction toward the feed oil pipe (downward direction), to generate the restoring force of the frustum seal surface in the outward radius direction and in the direction in which the fuel cap becomes distant from the feed oil pipe (upward direction).

Setting the inclination of the frustum seal surface in the outward radius and the upward directions is also conceivable. In this case, the deformation of the seal ring occurs in the inward radius direction and in the direction in which the fuel cap becomes distant from the feed oil pipe (upward direction), and the restoring force occurs in the outward radius direction and in the direction in which the fuel cap approaches the feed oil pipe (downward direction). Therefore, there is the possibility that the frustum seal surface be pushed in the upward direction by fuel steam pressure sent from the feed oil pipe, to cause the frustum seal surface to be separated from the inner side surface of the feed oil pipe. On the other hand, on the frustum seal surface inclined in the outward radius and the downward directions, the fuel steam pressure works in the direction in which the lower annular edge is pressure-contacted with the inner side surface of the oil filler port. In view of this, it is preferable that the frustum seal surface be inclined in the outward radius and the downward directions.

In order to hold the upper annular edge more tightly between the upper surface of the sleeve and the head portion of the closure body, it is recommended that cross-sectional thickness of the upper annular edge is larger than thickness of the seal frustum surface. As a result, the upper surface of the sleeve and the head portion of the closure body become able to hold the upper annular edge alone reliably without touching the frustum seal surface. Furthermore, when the cross sectional shape of the upper annular edge is set to a circular shape or a polygonal shape (including a diamond shape) into the corner portions of which project up and down, the upper annular edge can be brought into linear contact with both the upper surface of the sleeve and the head portion of the closure body, and the more tight holding of the upper annular edge can be attained with an increased holding pressure.

In order to pressure-contact the outer circumferential surface of the lower annular edge with the inner side surface of the oil filler port by the restoring force of the frustum seal surface and thereby secure the necessary and sufficient air-tightness, it is demanded that the outer diameter of the outer circumferential surface of the lower annular edge is not smaller than the inner diameter of the inner side surface of the oil filler port. This means, resistance occurs where the seal ring is fitted into the feed oil pipe. Therefore, in order to fit the seal ring into the feed oil pipe smoothly while allowing the deformation of the frustum seal surface, the lower annular edge may be made convergent in the downward direction so that the outer circumferential surface thereof becomes an inclined surface. As a result, it becomes possible that the outer circumferential surface of an inclined cross section fits into the oil filler port while the outer circumferential surface sliding-contacts with an end edge of the oil filler port in the securing-started stage, and that the outer circumferential surface of the lower annular edge is pressure-contacted with the inner side surface of the oil filler port so as to provide the necessary and sufficient airtightness of the fuel cap by deforming the frustum seal surface at the same time. Moreover, the outer circumferential surface of an inclined cross section is necessarily brought into linear contact with the inner side surface of the oil filler port, so that the contacting pressure can be heightened. This enables the air-tightness of the fuel cap to be improved.

Therefore, it is preferable that the sleeve adapted to lift from the lower side thereof the seal ring having a frustum seal surface has a structure in which a frustum sleeve surface has an angle of inclination acuter than that of the frustum seal surface of the seal ring, and in which the upper annular edge is held from the upper and lower sides by the upper edge of this frustum seal surface and the lower surface of the head portion of the closure body. The seal ring in the present invention attains the air-tightness of the fuel cap by pressure-contacting the outer circumferential surface of the lower annular edge with the inner side surface of the oil filler port by utilizing the restoring force of the deformed frustum seal surface. Therefore, it is preferable that the sleeve can be also provided with a frustum sleeve surface engaged from the lower side with the seal ring so as not to obstruct deformation of the downwardly inclined frustum seal surface. As a result, the upper annular edge of the seal ring is held by the upper edge of the frustum seal surface linearly engaged therewith, and the holding pressure can also be heightened.

In order to hold the upper annular edge of the seal ring by the upper surface of the sleeve and the lower surface of the head portion of the closure body, the holding tightness is heightened more easily by elastically deforming the upper annular edge than by compression-deforming the upper annular edge. For this reason, the seal ring may be formed so that the upper annular edge has a horseshoe-shaped diametrical cross section extending around the diametrical center thereof, and holds the upper annular edge by the upper surface of the sleeve and the head portion of the closure body from the upper and lower sides and elastically deforms the same. The horseshoe-shaped upper portion of the upper annular edge is pressed from the upper side by the lower surface of the head portion of the closure body and elastically deformed to the lower side, and the horseshoe-shaped lower portion of the upper annular edge is pressed from the lower side by the upper surface of the sleeve and elastically deformed to the upper side. Thus, a restoring force is generated in both of these cases to cause the seal ring to be pressure-contacted with the lower surface of the head portion of the closure body or the upper surface of the sleeve. As a result, the stable holding of the upper annular edge as a whole by the upper surface of the sleeve and the lower surface of the head portion of the closure body is attained.

In the fuel cap according to the present invention, the closure body having stopper projections is turned, and the sleeve having stopper recesses is firmly positioned in the turning direction, the closure body being thereby temporarily released from the influence of the seal ring. Therefore, it is demanded that the sleeve be firmly positioned with the anti-rotation projections fitted reliably in the clearances between the ribs provided on the inner side surface of the oil filler port, and that, at the same time, the turning operation of the closure body does not have influence upon the firmly positioning of the sleeve. In view of these, it is conceivable that the sleeve can be divided into two parts, and that one divisional part be made to have a position fixing operation so as to intercept the influence ascribed to the turning operation of the closure body.

To be concrete, the sleeve includes two members, i.e. a lower sleeve and an upper sleeve. The lower sleeve includes connecting recesses opening upwardly arranged to the inner side surface thereof, anti-rotation projections extending downwardly arranged to the outer side surface thereof so as to fit into the clearances between the ribs, and engagement flanges extending radially outwardly engaged from the upper side with the ribs. The upper sleeve includes an annular sleeve surface arranged to the inner side surface thereof with stopper recesses opening upwardly to receive the stopper projections, and connecting projections extending toward the lower sleeve arranged to the outer side surface thereof so as to fit into the connecting recesses.

The closure of the above-described construction is formed into a unitary structure by assembling the seal ring, the upper sleeve, the coiled spring, the lower sleeve and the engagement member in the mentioned order on the trunk portion of the closure body. As a result, the holding of the seal ring by the upper surface of the upper sleeve and the lower surface of the head portion of the closure body becomes tight when the stopper projections are fitted into the stopper recesses to cause the upper sleeve to be lifted by the force of the coiled spring, and loose when the stopper projections are disengaged from the stopper recesses and run on the annular sleeve surface to cause the upper sleeve to be pressed down against the force of the coiled spring.

Since the lower sleeve forms an engagement flange engaged from the upper side with the ribs, the anti-rotation projections can be reliably engaged with the ribs without passing through the clearances therebetween, and thereby positioned firmly. The upper sleeve is engaged at the connecting projections thereof with the connecting recesses of the lower sleeve and thereby connected thereto, so that the upper sleeve can be positioned firmly and stably in accordance with the firmly positioning of the lower sleeve. When the direction in which the engagement of the connecting projections with the connecting recesses is made is specially set to the vertical direction, the direction in which the resiliency generated by the coiled spring interposed between the upper sleeve and the lower sleeve works can be advantageously limited to the vertical direction. Moreover, the lower sleeve is only contacted with the upper surface of the engagement member, and does not receive the influence of the engagement member operatively connected to the closure body. Especially, since the coiled spring leaves the engagement member, the coiled spring ceases to receive the influence of the engagement member operatively connected to the closure body, so that a stable resiliency becomes able to be generated.

The fuel cap according to the present invention has the following effects.

First, the closure body does not receive the influence of the seal ring during the time from the securing-started stage to the securing-finished stage, so that the fuel cap can be turned with a comparatively low torque. Moreover, since the annular sleeve surface, which the stopper projections run on and are sliding-contacted with, is formed with incline between the stopper recesses, the turning operation of the fuel cap in the inclining direction of the inclined surfaces becomes easy, and the oil filler port can be opened and closed reliably without encountering the interruption during the turning operation of the fuel cap. The stopper projections of the closure body fit into the stopper recesses of the sleeve in the securing-started stage and the securing-finished stage, so that the fuel cap becomes stable and is not turned inadvertently. Thus, the fuel cap according to the present invention is effective in turning operation itself easily and reliably, and, moreover, effective to maintain the shut of the oil filler port stable in the securing-finished stage.

Second, the air-tightness of the fuel cap is secured by pressure-contacting the seal ring with the inner side surface of the oil filler port in radius direction from the center thereof. Therefore, there is advantage that substantially uniformed air tightness can be obtained in a wide range from the securing-started stage in which the seal ring fits in the oil filler port to the securing-finished stage. The fuel cap according to the present invention can be tightly secured to the oil filler port by only a horizontal turning operation, and, in the securing-finished stage, the engagement projections are engaged from the lower side with the ribs provided on the inner side surface of the oil filler port, so that the twisting of the fuel cap with respect to the oil filler port rarely occurs. This brings about an effect of rendering it difficult to cause the fuel cap to slip off from the oil filler port in the securing-finished stage. Even if the fuel cap is accidentally twisted, the air-tightness thereof does not lower since the seal ring employs a structure for attaining the air-tightness as mentioned above. Therefore, the fuel cap according to the present invention also has an effect of rendering it possible to obtain air-tightness stably and reliably.

Besides these effects, the fuel cap according to the present invention secures the stability thereof during the securing thereof to the oil filler port and the air-tightness of the seal ring not relying upon the accurate dimensions of each member but depending upon the positional and connecting relation between the members. Namely, the fuel cap according to the present invention may moderate the dimension control as compared with conventional fuel caps of this kind. Even in such a case, the stability of the fuel cap during the securing thereof with respect to the oil filler port and the air-tightness of the seal ring can be improved. The moderation of the dimension control has an effect in reducing the manufacturing cost of the fuel cap according to the present invention. Thus, the fuel cap according to the present invention can also obtain a high cost performance.

DESCRIPTION OF THE PREFERRED EMBODIMENTS

The modes of embodiments of the present invention will now be described with reference to the drawings.

Figure 1:
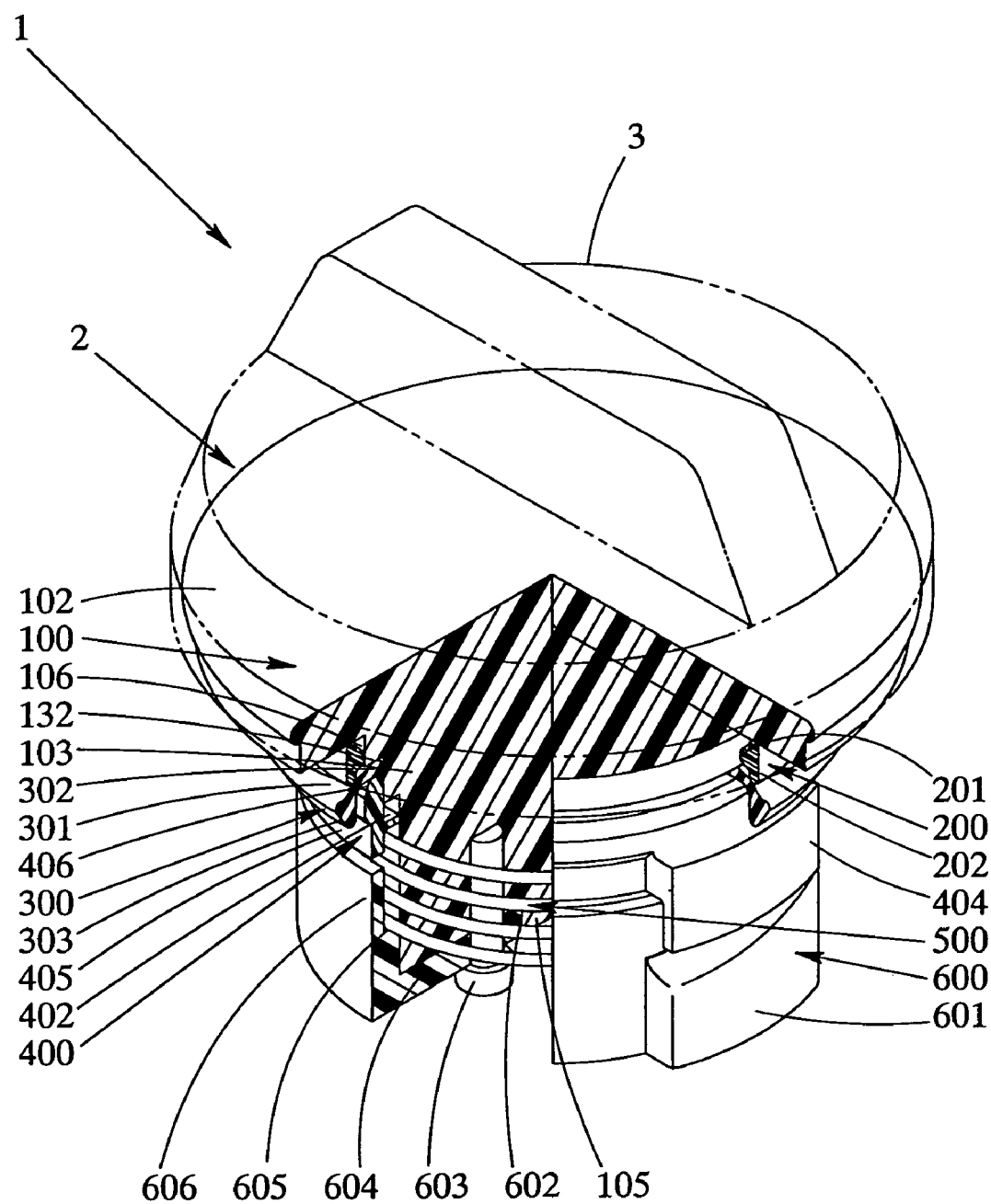
FIG. 1 is a partially cutaway perspective view of a fuel cap to which the present invention is applied.
Figure 2:
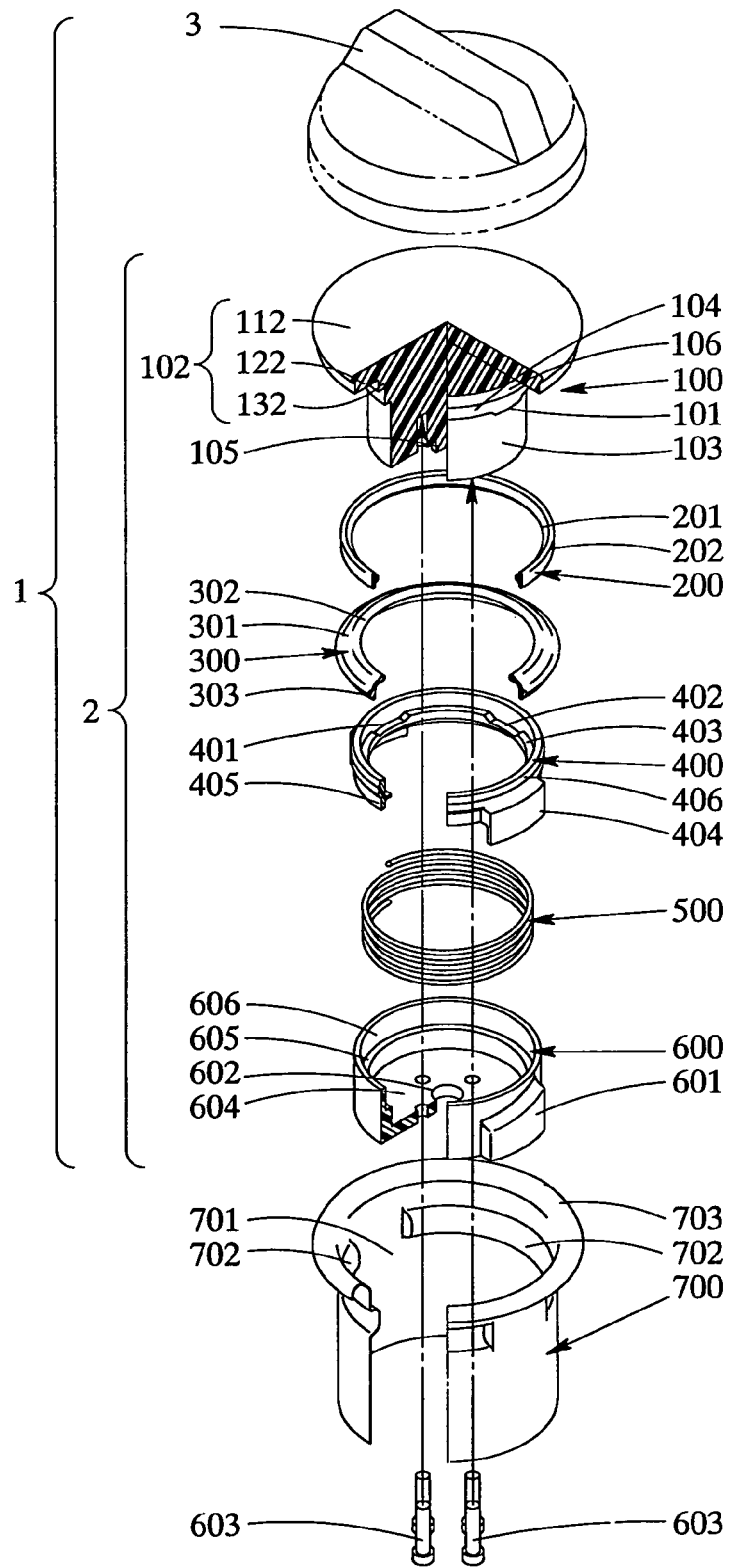
FIG. 2 is a partially cutaway exploded perspective view of the same fuel cap in FIG. 1.

The fuel cap 1 is formed as shown in FIGS. 1 and 2, by fixing a fuel cap turning handle 3 to a multi-step head portion 102 including a head top 112 thereof, an upper step 122 thereof and a lower step 132 thereof in a closure body 100 of a closure 2 based on the present invention. The closure 2 based on the present invention is formed into a unitary structure by fitting a retainer ring 200 around the lower step 132 of the head portion 102 of the closure body 100, and a seal ring 300, a sleeve 400 and a coiled spring 500 in the mentioned order in the downward direction around a trunk portion 103 extending from the lower step 132 of the head portion 102 in the axially downward direction, and connecting an engagement member 600 to a lower end of the trunk portion 103. These members except the seal ring 300 are unitary molded products of mainly a synthetic resin, and the seal ring 300 is made of rubber of an excellent oil resistance. To make these members, various kinds of known materials can be used. This fuel cap 1 is secured to an oil filler port 700 provided on an inner side surface 701 thereof with a pair of ribs 702, 702 made integral therewith, by having engagement projections 601, which are provided on the engagement member 600, crawl into lower portions of the ribs 702, and engaging the engagement projections with upper portions of the ribs 702.

The closure body 100 is formed so as to have a cylindrical trunk portion 103 extending downward in the axial direction from a lower surface of a lower step 132 of the head portion 102 be operated by the handle 3. This closure body 100 is provided on a side surface of the trunk portion 103, which is formed just below the head portion 102, with an annular trunk surface 104 having a pair of downwardly extending stopper projections 101, 101 on the portions thereof which are 180-degree symmetrically spaced from each other. The stopper projection 101 has a shape of an inverted trapezoid in front elevation, and inclined surfaces on the circumferentially front and rear portions thereof. This makes it easy to fit and disengage the stopper projections 101, 101 in and from the stopper recesses 401, 402 provided in an annular sleeve surface 403 and similar in shape to each other in front elevation. In this closure body 100, the axis thereof is matched with the engagement member 600 by engaging the engagement projection 105 extending from a lower end surface of the trunk portion 103 with an engagement hole 602 of an engagement member 600, which is then connected to and united by bolts 603. Thus, the closure body 100 and engagement member 600 hold other members therebetween and attain the unity as the closure 2. In addition, the ability of the fuel cap to turn the closure body 100 and engagement member 600 in one body is attained at all times.

A retainer ring 200 is interposed between the lower surface of the upper step 122 of the head portion 102 of the closure body 100 and the seal ring 300 so as to fill up a clearance therebetween. The retainer ring 200 slides on the lower surface of the upper step 122 of the head portion 102, and thereby restrains an increase of the torque during a fuel cap turning operation. The retainer ring 200 in this embodiment employs a cross-sectionally 90-degree turned laterally T-shaped structure including an inner circumferential retainer portion 201 fitted firmly in a circumferential surface 106 of the lower step 132 of the head portion 102, and an outer circumferential retainer portion 202 engaged at an upper edge thereof with the lower surface of the upper step 122 of the head portion 102, and at a lower edge thereof with a lower edge of a frustum seal surface 301 of the seal ring 300. When the outer circumferential retainer portion 202 of this retainer ring 200 presses from the upper side the frustum seal surface 301 of the seal ring 300, the function of the retainer ring 200 of controlling the elastic deformation of the frustum seal surface 301 so that this elastic deformation does not occur in an upwardly projecting mode, and directing the restoring force in radius direction occurring due to the elastic deformation of the frustum seal surface 301 is displayed.

The seal ring 300 is a rubber ring pressure-contacted with an inner side surface 701 of the oil filler port 700 in radius direction from the center thereof, and employs a skirt structure including an upper annular edge 302 fitted firmly in a trunk portion annular surface 104 of the closure body 100, a lower annular edge 303 diverging from this upper annular edge 302, and a frustum seal surface 301 connecting the upper annular edge 302 and lower annular edge 303 together and having a radially outwardly lowering gradient. When the lower annular edge 303 of this seal ring 300 is pressed against the inner side surface 701 of the oil filler port 700 to cause the frustum seal surface 301 to be elastically deformed, the frustum seal surface 301 generates a restoring force for lifting the lower annular edge 303. When the lower annular edge 303 is pressure-contacted in radius direction from the center thereof with the inner side surface 701 of the oil filler port 700 by utilizing this restoring force, the air-tightness of the fuel cap is attained.

Figure 4:
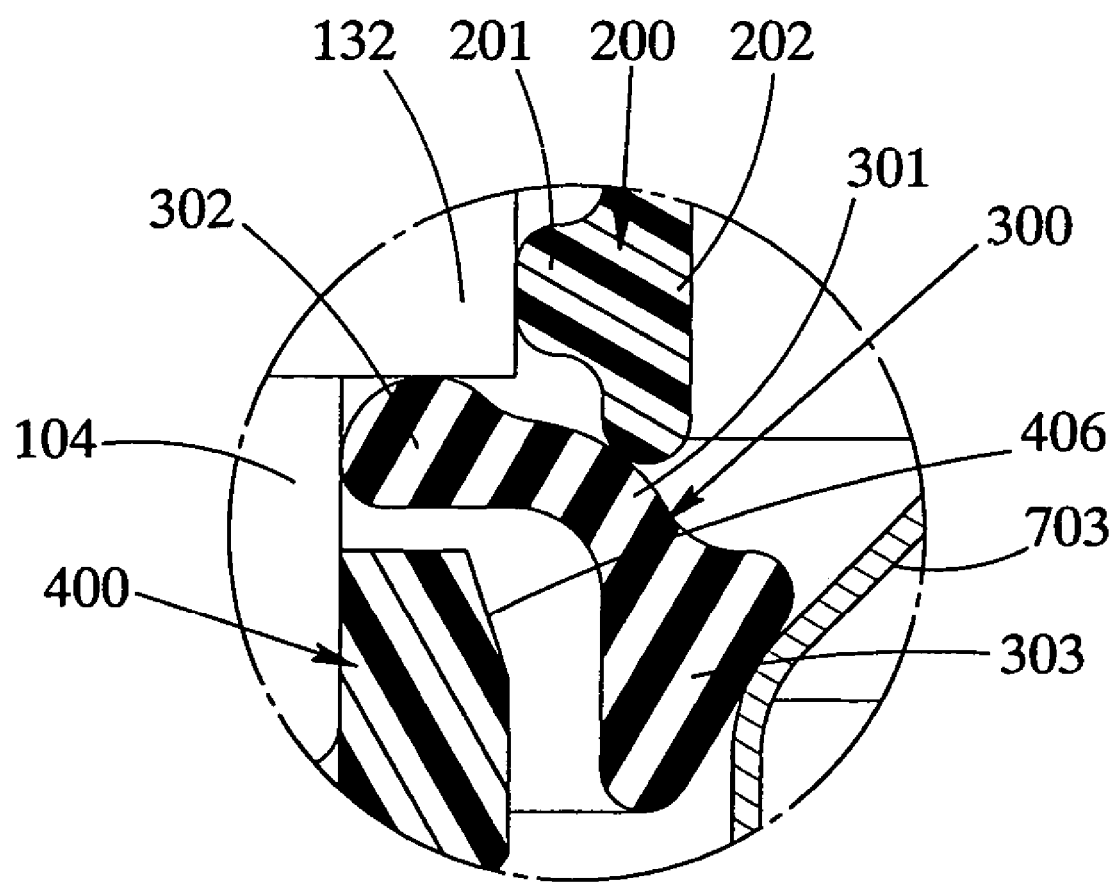
FIG. 4 is an enlarged view of an encircled portion designated by an arrow A in FIG. 3.
Figure 5:
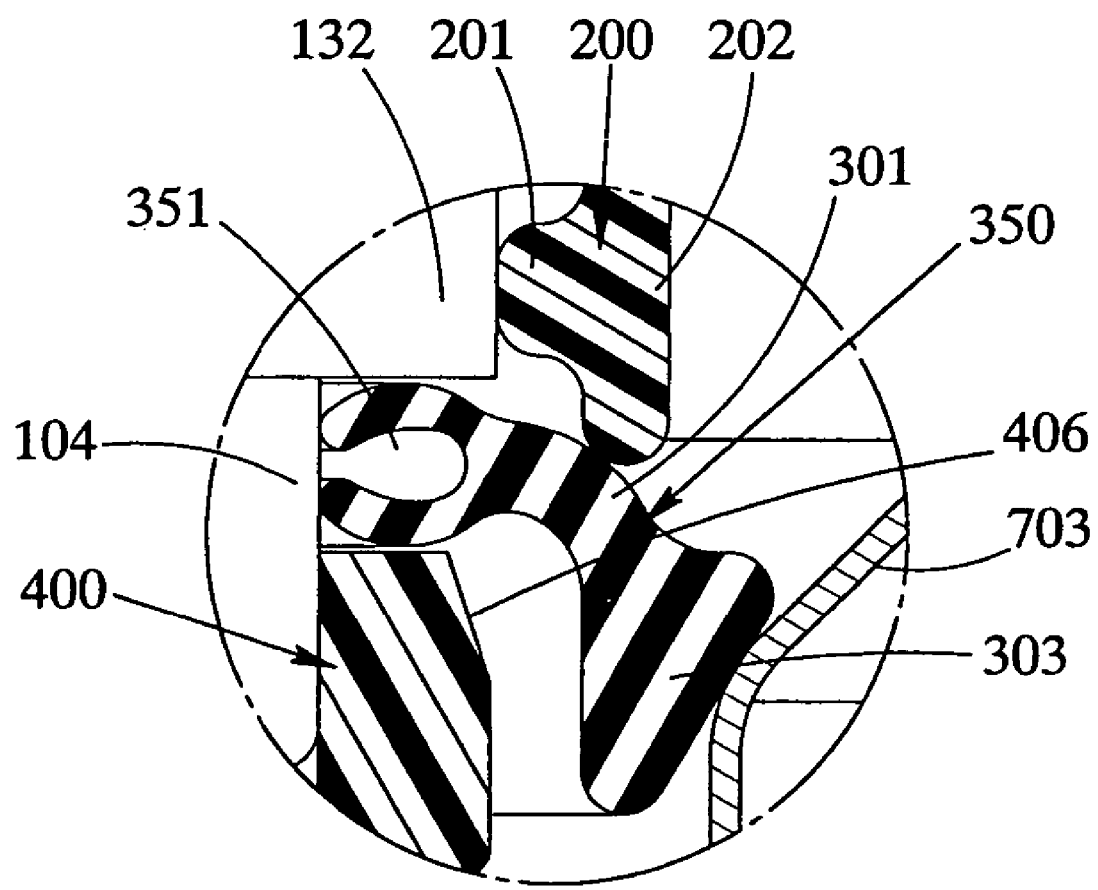
FIG. 5 is an enlarged view showing the encircled portion of another example of the seal ring which corresponds to what is designated by the arrow A in FIG. 3.

Since the upper annular edge 302 of the seal ring 300 in this embodiment is formed to a circular cross section and set to a thickness larger than that of the frustum seal surface 301 as shown in FIG. 4, the lower surface of the lower step 132 of the head portion 102 of the closure body 100 and the upper edge of the sleeve 400 are respectively brought into linear contact with the upper annular surface 302. This enables the seal ring to be held more tightly by the lower surface of the head portion 102 of the closure body 100 and the upper edge of the sleeve 400. When another example of a seal ring 350 which has an upper annular edge 351 having a substantially horseshoe-shaped cross section as seen in FIG. 5 is used, the upper annular edge 351 held by the lower surface of the lower step 132 of the head portion 102 of the closure body 100 and the upper edge of the sleeve 400 displays a restoring force based on the elastic deformation thereof ascribed to the holding force, and the upper annular edge 351 becomes possible to be held more tightly. The seal ring 300 in this embodiment is formed to a substantially triangular cross section so that the outer circumferential surface becomes an inclined surface by converging the lower annular edge 303 in the downward direction. As a result, the outer circumferential surface made of the inclined surface comes to be easily fitted in the oil filler port by bringing the outer circumferential surface made of the inclined surface into sliding-contact with the end edge of the oil filler port.

Figure 16:
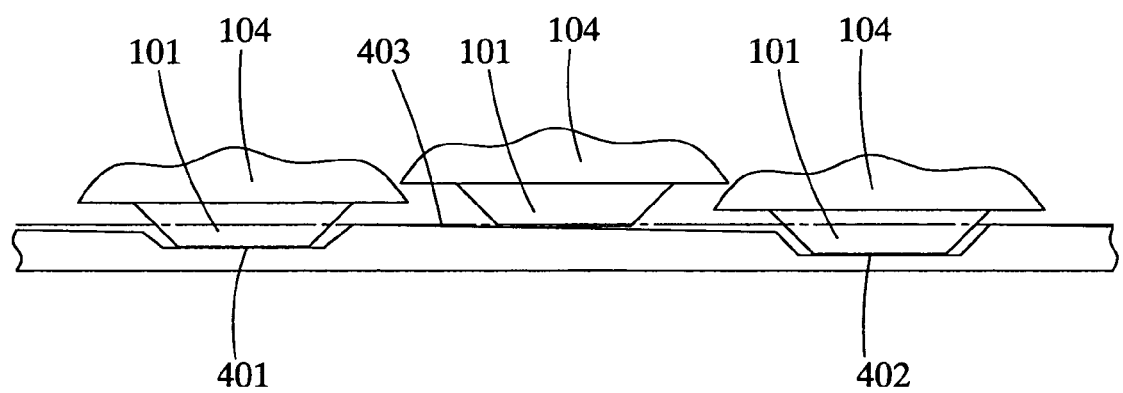
FIG. 16 is a partial circumferential developed view showing the relation between stopper projections and stopper recesses in the fuel cap securing operation from the securing-started stage to the securing-finished stage.

A sleeve 400 has an upwardly decreasing outer diameter so as to form a frustum sleeve surface 406 having the angle of inclination of which is larger than that of the frustum seal surface 301 of the seal ring 300. Therefore, the sleeve 400 is substantially cylinder having a tapered upper edge of a substantially triangular cross section. The sleeve 400 is provided in an inner side surface thereof with an annular sleeve surface 403 having stopper recesses 401, 402 opened upwardly into which the stopper projections 101 of the closure body 100 is fitted. The stopper recesses 401, 402 in this embodiment have an inverted frustum shape similar in front elevation to the shape of the stopper projections 101, and can be divided into stopper recesses (which will hereinafter be referred to as starting stopper recesses 401) provided in circumferential positions corresponding to die securing-started stage, and another stopper recesses (which will hereinafter be referred to as finishing stopper recesses 402) provided in circumferential positions corresponding to the securing-finished stage. These starting stopper recesses 401 and finishing stopper recesses 402 are made of two recesses respectively, and they are arranged at 90-degree clearances. The depths of the starting stopper recesses 401 and finishing stopper recesses 402 are different from each other. The former recesses are made relatively small, and the latter recesses are made relatively large. The annular sleeve surface 403 connecting these stopper recesses 401, 402 together are inclined downward (refer to FIG. 16 which will be referred to later, and the downward gradient is omitted in the other drawings) in one direction respectively, i.e., clockwise in plan from the starting stopper recesses 401 toward the finishing stopper recesses 402. As a result, the stopper projections 101 fitted in the starting stopper recesses 401 in the securing-started stage disengage from the starting stopper recesses 401 easily in accordance with the turning operation of the closure 2. The stopper projections 101 are then moved in sliding contact with the annular sleeve surface 403, and become easy to fit in the finishing stopper recesses 402 in the securing-finished stage. The stopper projections 101 rarely leave the finishing stopper recesses 402, so that the securing of the closure 2 to the oil filler port 700 can be stabilized.

The sleeve 400 is provided on the outer side surface thereof with a pair of downwardly extending anti-rotation projections 404, 404 fitted in the clearances between ribs 702, 702 of the oil filler cap 700 and spaced from each other at 180 degrees. The anti-rotation projections 404 in this embodiment have a circumferential width equal to that of the clearances between the ribs 702, 702 of the oil filler port 700, fit in the clearances between the ribs 702, 702 in any stage from the securing-started stage to the securing-finished stage, and have a rectangular shape in front elevation having a length restricting the rotation of the sleeve 400. Owing to this structure, the sleeve 400 is positioned firmly and relatively from the securing-started stage at which the fuel cap 1 is secured to the oil filler port 700, with respect to the closure body 100 and engagement member 600. Besides these members, the sleeve 400 in this embodiment has a sleeve guide surface 405 continuing to the outer side surface and extending downward from the annular sleeve surface 403, so as to guide a coiled spring 500 engaged from the lower side with a lower surface of the annular sleeve surface 403.

An engagement member 600 is a substantially cylindrical thick-walled structure closed with a bottom surface 604, and provided with an annular engagement surface 605 constituting an inner side surface thereof, and engagement projections 601, 601 which pass through the clearances between the ribs 702, 702 in the oil filler port 700 and then turn and engage the ribs 702 from the lower side thereof. In this embodiment, an engagement guide surface 606 adapted to guide the coiled spring 500 supported on the annular engagement surface 605 is extended upward. The engagement projections 601 in this embodiment have an anticlockwise inclined upper surface in front elevation. When the closure body 100 is turned to right in the closing direction, the engagement projections are pressed down while sliding in the lower surface of the ribs 702. The closure body 100 is fitted at the trunk portion 103 into the annular engagement surface 605 with the engagement projections 105 of the trunk portion 103 fitted into the engagement hole 602 provided in the bottom surface 604, the closure body 100 being thereby connected to the engagement member 600. Further, the engagement member 600 is fixed to the closure body 100 by screwing bolts 603 thereto through the bottom surface 604. A coiled spring 500 serving as an elastic member is interposed between the lower surface of the annular sleeve surface 403 of the sleeve 400 and the annular engagement surface 605, and urges the sleeve 400 against the engagement member 600 relatively upward.

Figure 3:
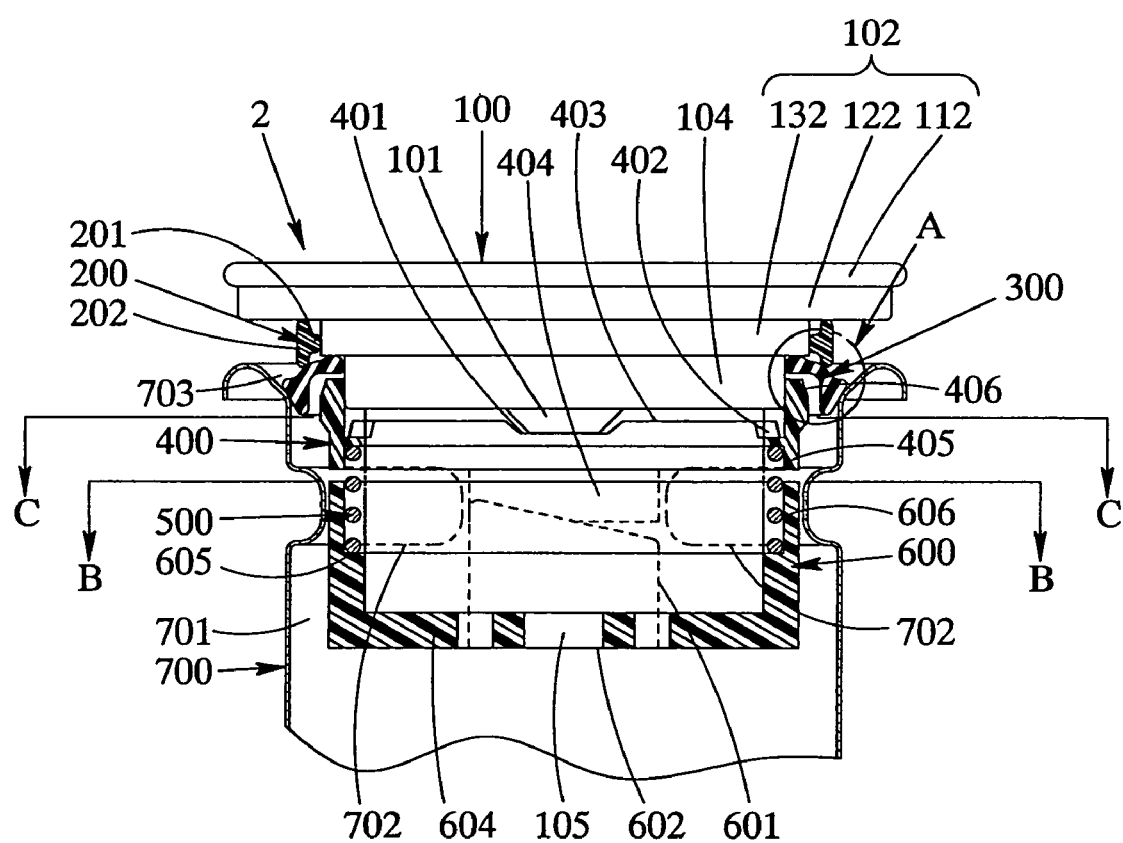
FIG. 3 is a longitudinal sectional view showing the securing-started stage of the same fuel cap in FIG. 1.

The fuel cap 1 in this embodiment is secured to the oil filler port 700 in the following order. First, in the securing-started stage, as seen in FIG. 3, the engagement projections 601, 601 of the engagement member 600 are inserted in the clearances between the ribs 702, 702 in the oil filler port 700, and the closure 2 is thereby fitted into the oil filler port 700. As seen in FIG. 4, the lower annular edge 303 of the seal ring 300 is engaged from the above with a folded end 703 of the oil filler port 700, and the upper annular edge 302 is engaged only with the lower surface of the lower step 132 of the head portion 102 of the closure body 100 by the elastic force of the frustum seal surface 301. Since the upper edge of the sleeve 400 is separated from the lower surface of the lower step 132 of the head portion 102 of the closure body 100, the holding of the upper annular edge 302 is not sufficiently, and, in this securing-started stage, the seal ring 300 does not display the air-tightness.

Figure 6:
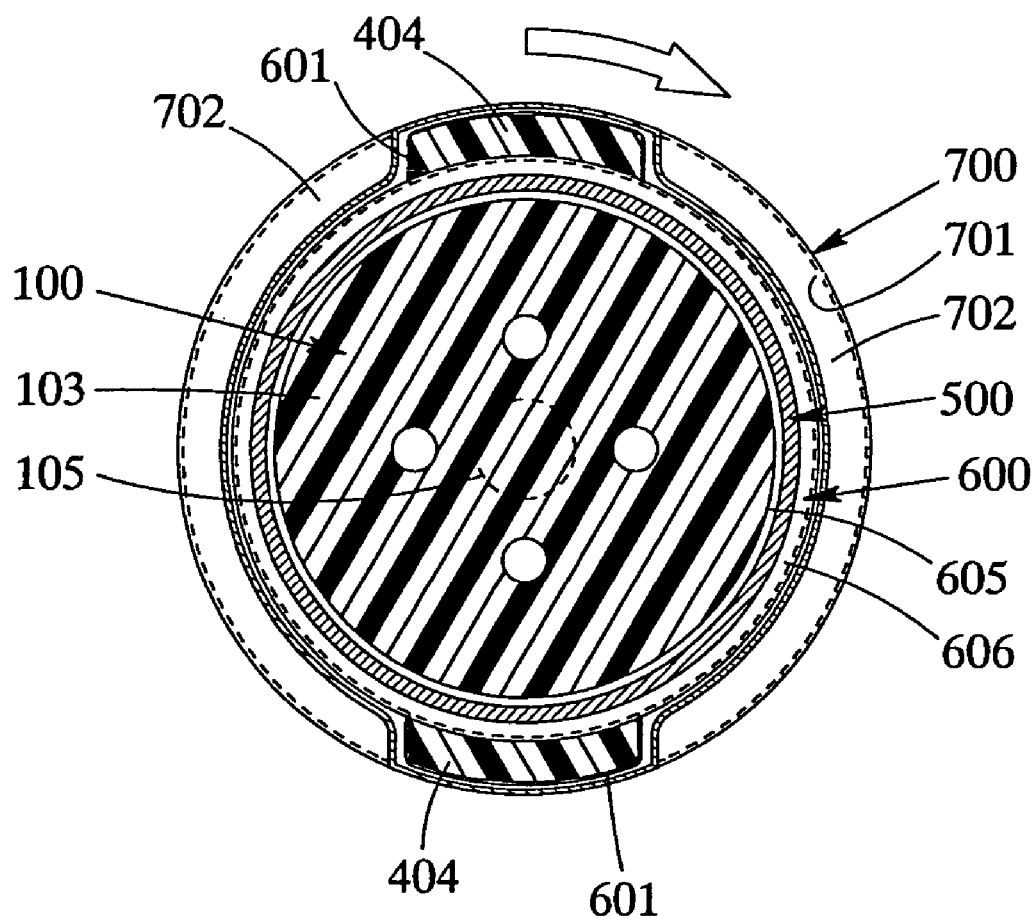
FIG. 6 is a sectional view taken along the line B-B in FIG. 3.
Figure 7:
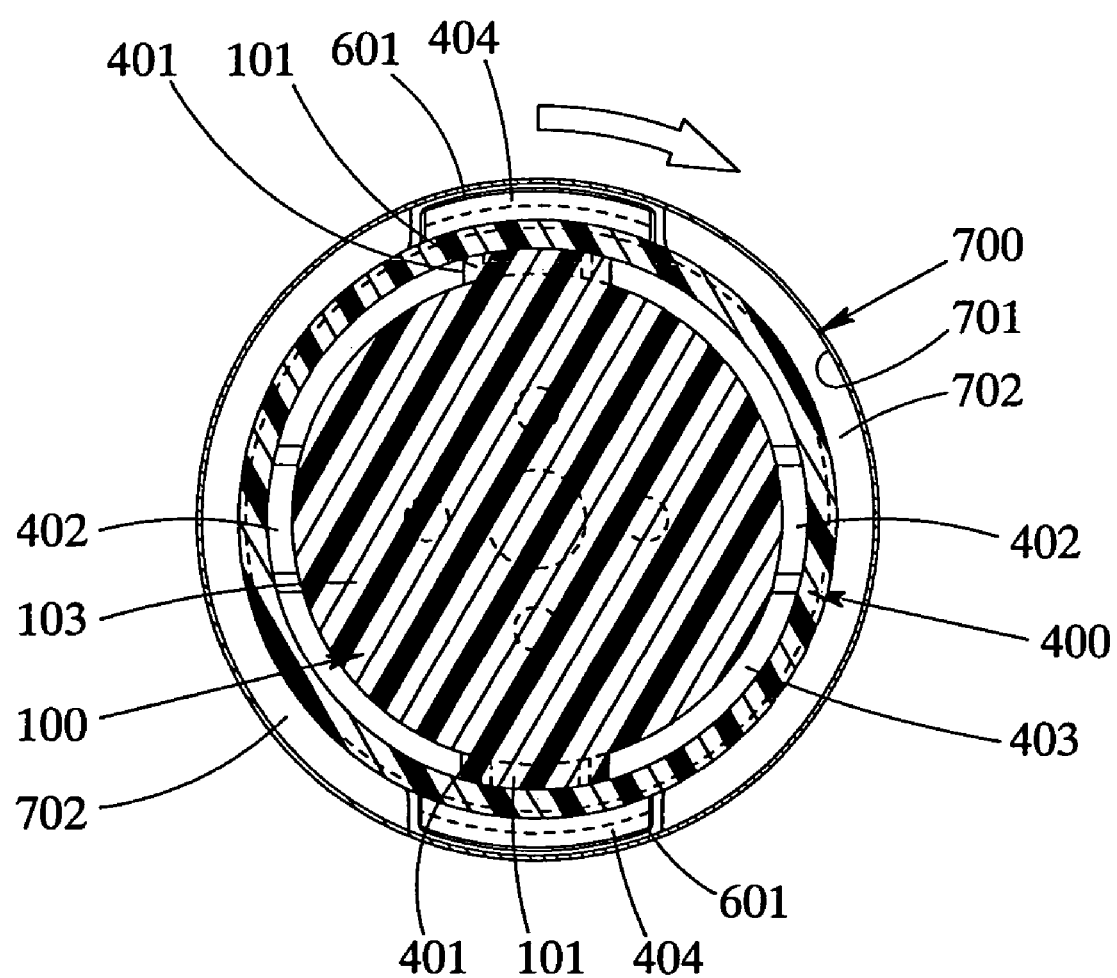
FIG. 7 is a sectional view taken along the line C-C in FIG. 3.

However, as seen in FIG. 6, the engagement projections 601 of the engagement member 600 have passed through the clearances between the ribs 702, 702, and positioned the downwardly inclined upper surface thereof under the ribs 702. As a result, the closure body 100 and engagement member 600 can be turned clockwise, i.e., in the closing direction so that the engagement projections 601 slip in the lower portions of the ribs 702. On the other hand, the sleeve 400 is fitted at the anti-rotation projections 404 between the ribs 702, 702 as seen in FIG. 7, and positioned and fixed relatively with respect to the closure body 100 and engagement member 600. The present invention carries out practically the reduction of torque in a fuel cap turning operation by varying the engaged condition between the starting stopper recesses 401 and finishing stopper recesses 402 formed in the annular sleeve surface 403 of the sleeve 400 thus relatively positioned and fixed and the stopper projections 101 formed on the turned closure body 100, and thereby temporarily reducing the tightness of the closure body 100 and seal ring 300.

Figure 8:
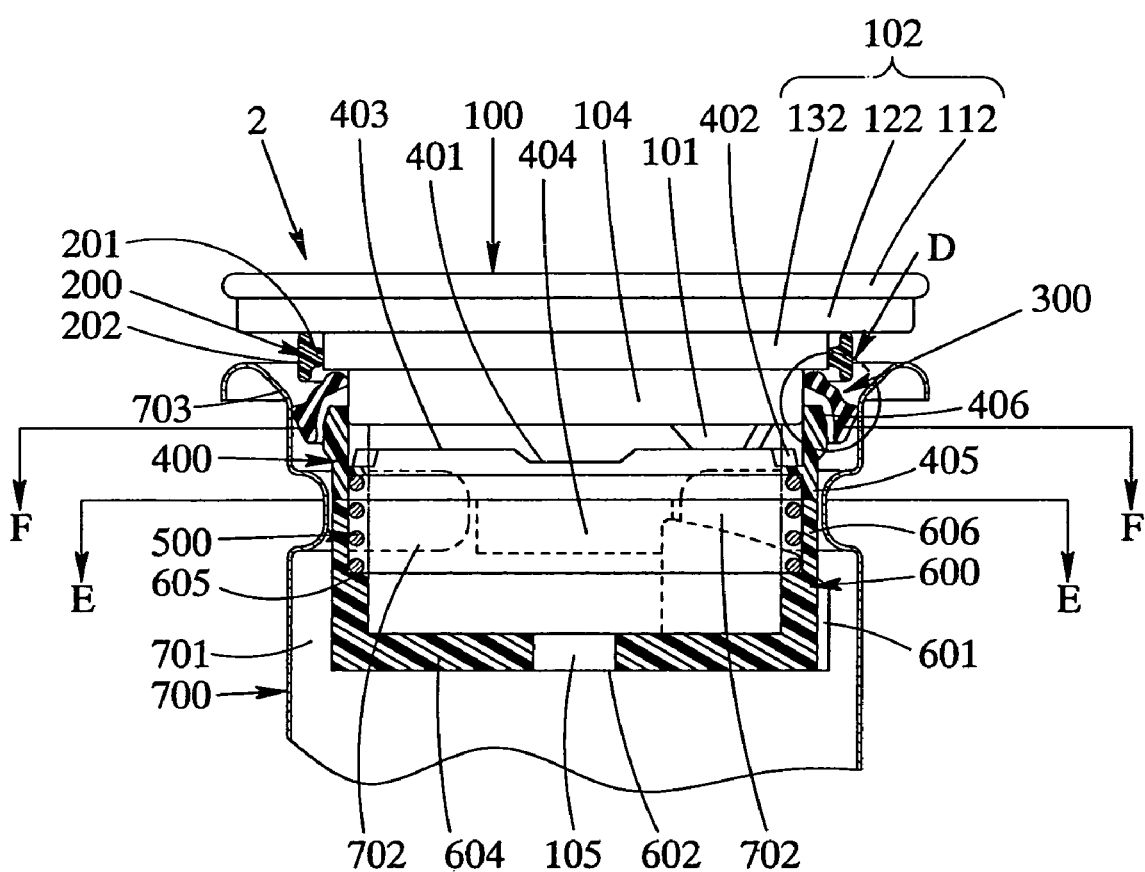
FIG. 8 is a longitudinal sectional view showing the securing-intermediated stage of the same fuel cap in FIG. 1.
Figure 9:
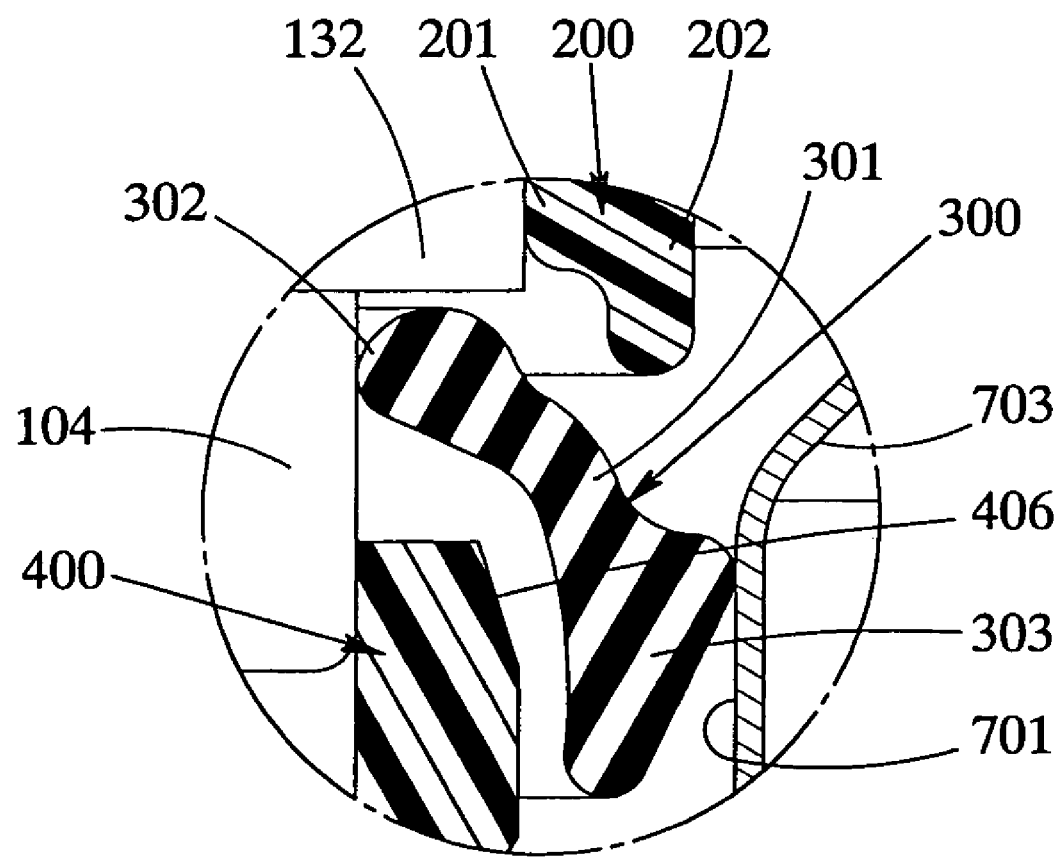
FIG. 9 is an enlarged view of an encircled portion designated by an arrow D in FIG. 8.
Figure 10:
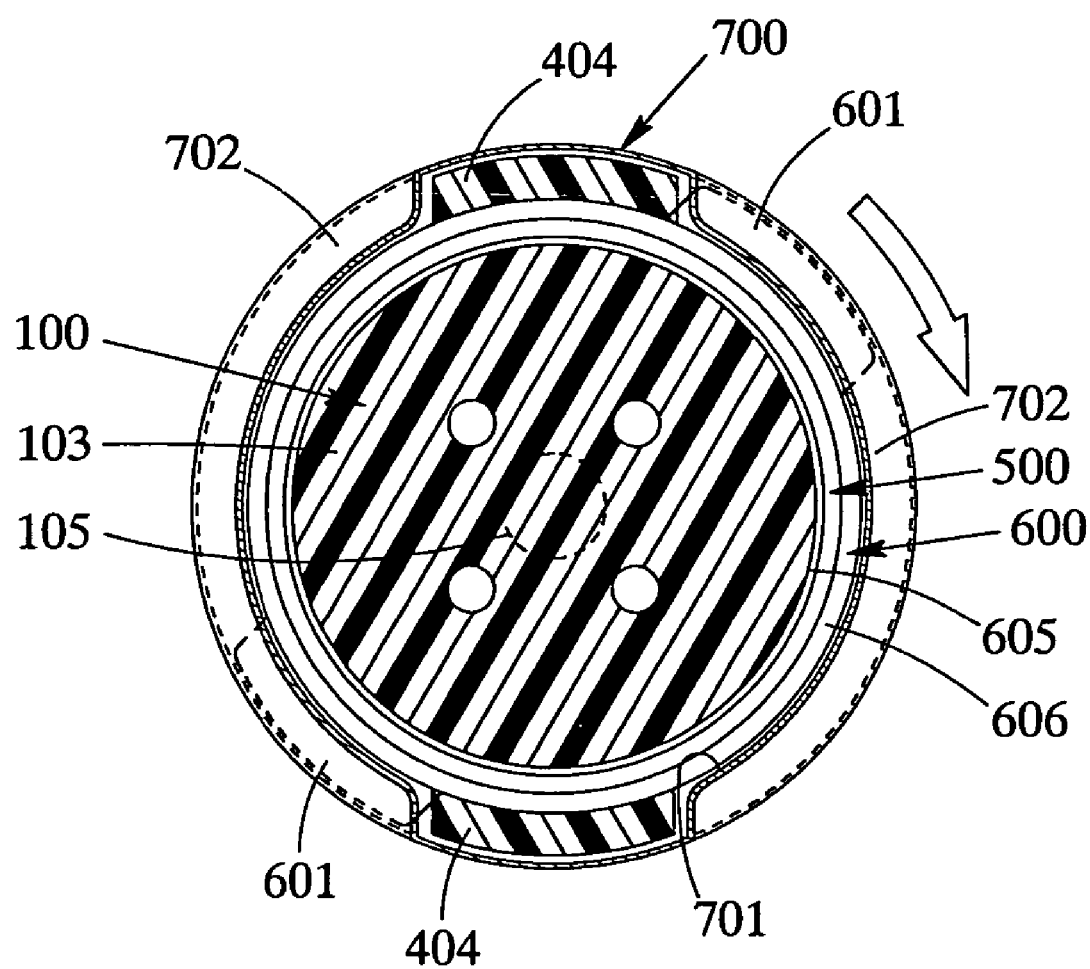
FIG. 10 is a sectional view taken along the line E-E in FIG. 8.
Figure 11:
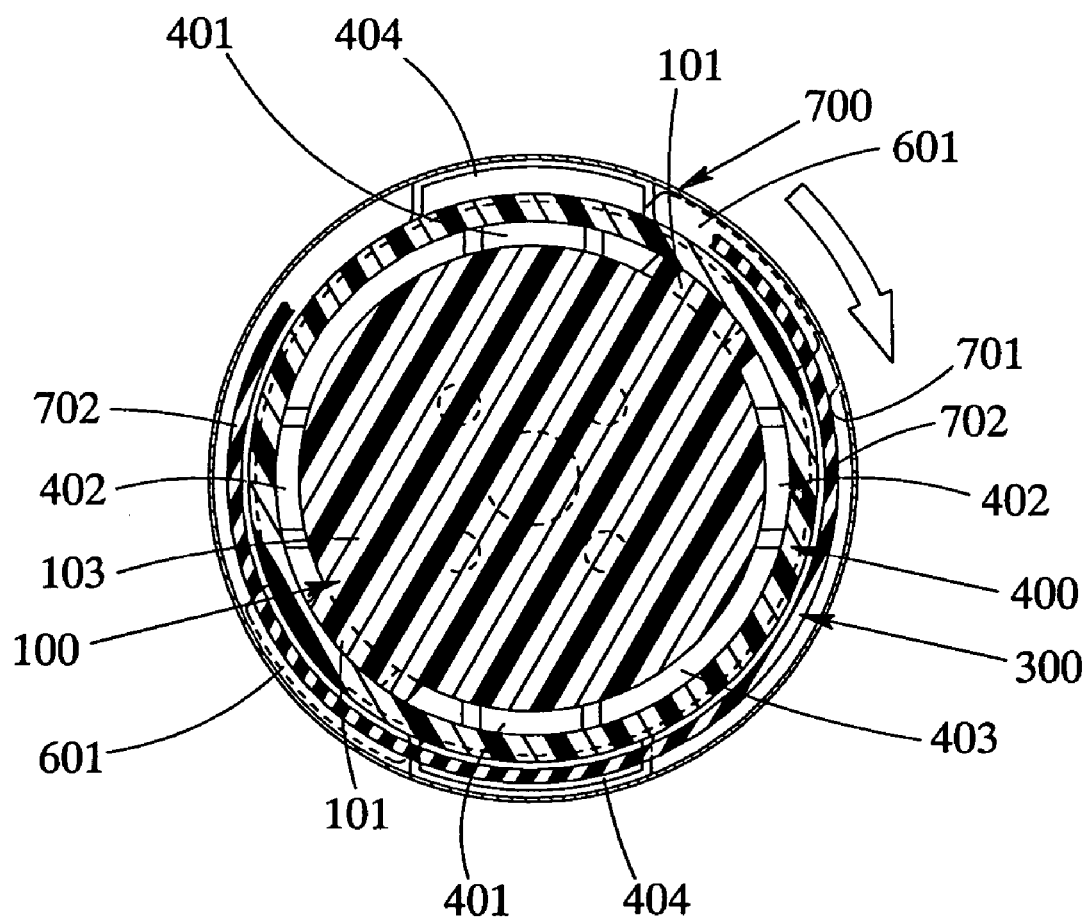
FIG. 11 is a sectional view taken along the line F-F in FIG. 8.

Namely, as seen in FIG. 8, in a securing-intermediated stage in which the closure body 100 starts being turned, the upper edge of the sleeve 400 is stayed away from the lower surface of the lower step 132 of the head portion 102 of the closure body 100 as seen in FIG. 9, so that the degree of the tightness of the closure body 100 and seal ring 300 is temporarily loosened. To be concrete, since the engagement projections 601 in the closure body 100 are made integral with the engagement member 600 which slips in the ribs 702 as seen in FIG. 10, the position of the closure body 100 in the direction of the height is determined by the engagement member 600, and the closure body 100 moves down with the engagement member 600. However, as seen in FIG. 11, the sleeve 400 which the anti-rotation projections 404 thereof are fitted between the ribs 702, 702 is positioned and fixed, so that the projections 101 of the closure body 100 necessarily run on (refer to FIG. 16) the annular sleeve surface 403 to cause the sleeve 400 to be relatively pressed down. Consequently, tightness of the seal ring 300 held by the lower surface of the lower step 132 of the head portion 102 of the closure body 100 and the upper edge of the sleeve 400 is lessened due to the relative downward pressing force of the sleeve 400.

The operability of the securing of the fuel cap 1 becomes higher in inverse proportion to the level of the torque needed to carry out the fuel cap turning operation. The seal ring 300 in the present invention secures the air-tightness of the fuel cap by pressure-contacting the lower annular edge 303 in radius direction from the center thereof with the inner side surface 701 of the oil filler port 700 by utilizing the elastic deformation of the frustum seal surface 301, so that it is not necessary to compress the seal ring 300 by the closure body 100. Therefore, as described above, the operability of the fuel cap can be improved by temporarily reducing the degree of tightness of the closure body 100 and seal ring 300 when a fuel cap turning operation is carried out, intercepting the influence of the friction of the seal ring 300 pressure-contacted with the inner side surface 701 of the oil filler port 700, and thereby holding down or preventing an increase in the torque needed to carry out a fuel cap turning operation.

The depth of the starting stopper recesses 401 is relatively small with respect to that of the finishing stopper recesses 402, and, to be concrete, limited to a level about a half of the length of the stopper projections 101 and both the stopper projections 101 and starting stopper. recesses 401 are inclined at the circumferentially front and rear portions thereof. Therefore, during a fuel cap turning operation in the securing-started stage, the stopper projections 101 can be disengaged from the starting stopper recesses 401 comparatively easily. Moreover, since the annular sleeve surface 403 is inclined downward from the starting stopper recesses 401 to the finishing stopper recesses 402, the turning operation of the closure body 100 can be carried out easily in the closing direction. Thus, the fuel cap turning operation in the securing-started stage starts with the disengagement of the stopper projections 101 from the starting stopper recesses 401 of a low load, and the stopper projections 101 which intercept the influence caused by the friction of the seal ring 300 move (refer to FIG. 16) along the downwardly inclined annular sleeve surface 403. This enables the torque exerted on the closure body 100 to be constituted by only the resistance occurring when the engagement projections 601 sliding-contact with the ribs 702. Therefore, a low bad excellent fuel cap turning operability is attained.

Figure 12:
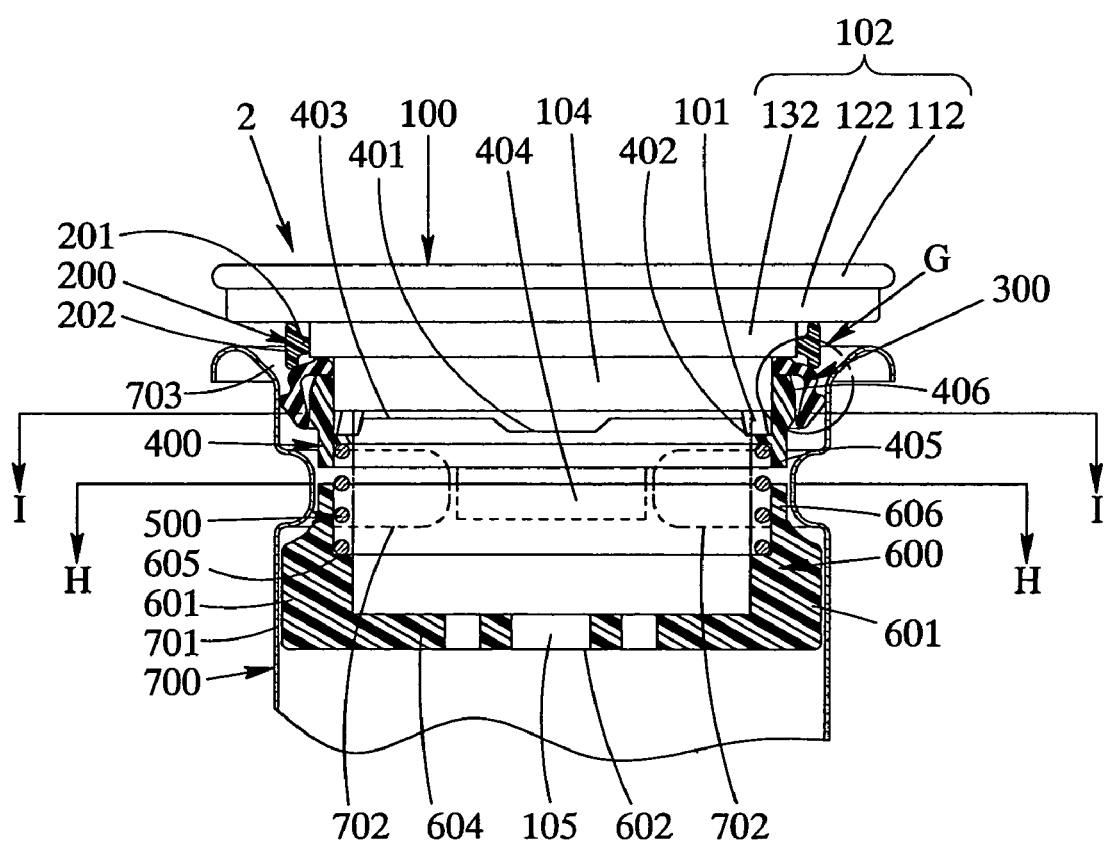
FIG. 12 is a longitudinal sectional view showing the securing-finished stage of the same fuel cap in FIG. 1.
Figure 14:
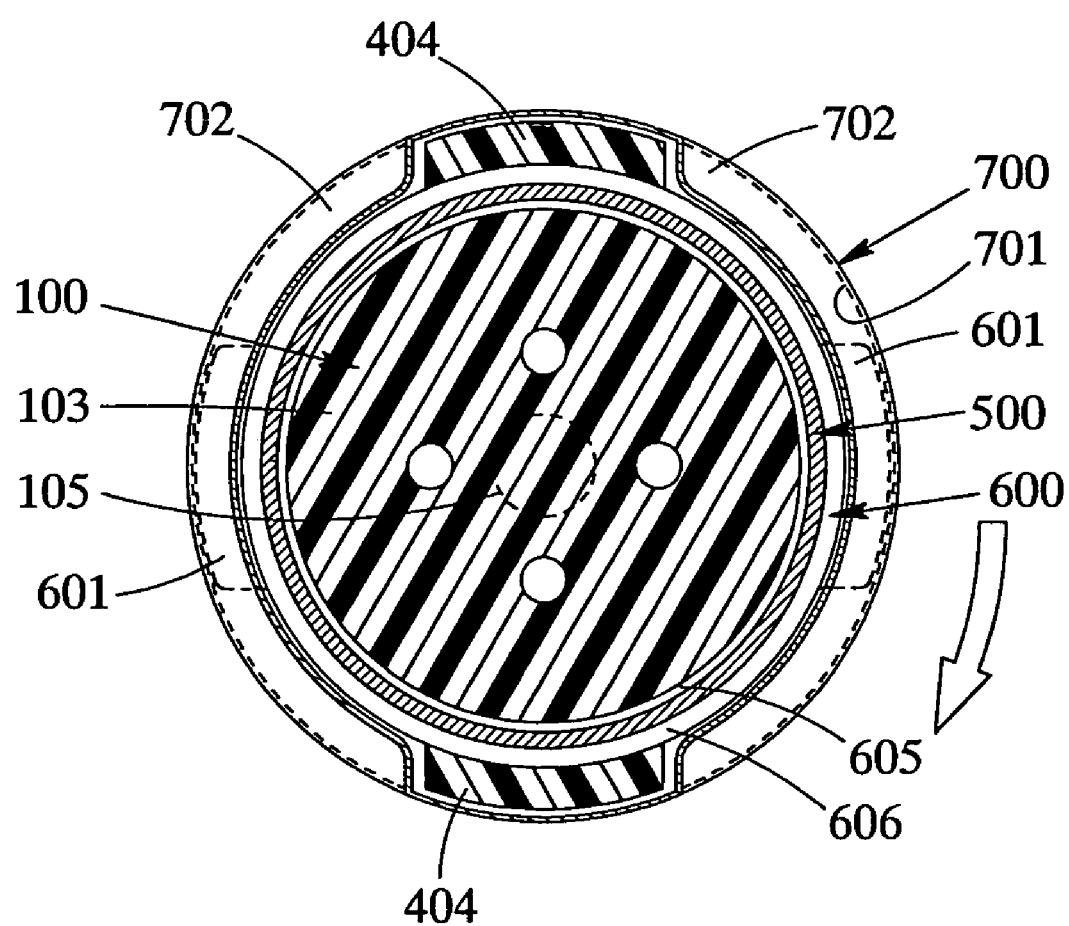
FIG. 14 is a sectional view taken along the line H-H in FIG. 12.
Figure 15:
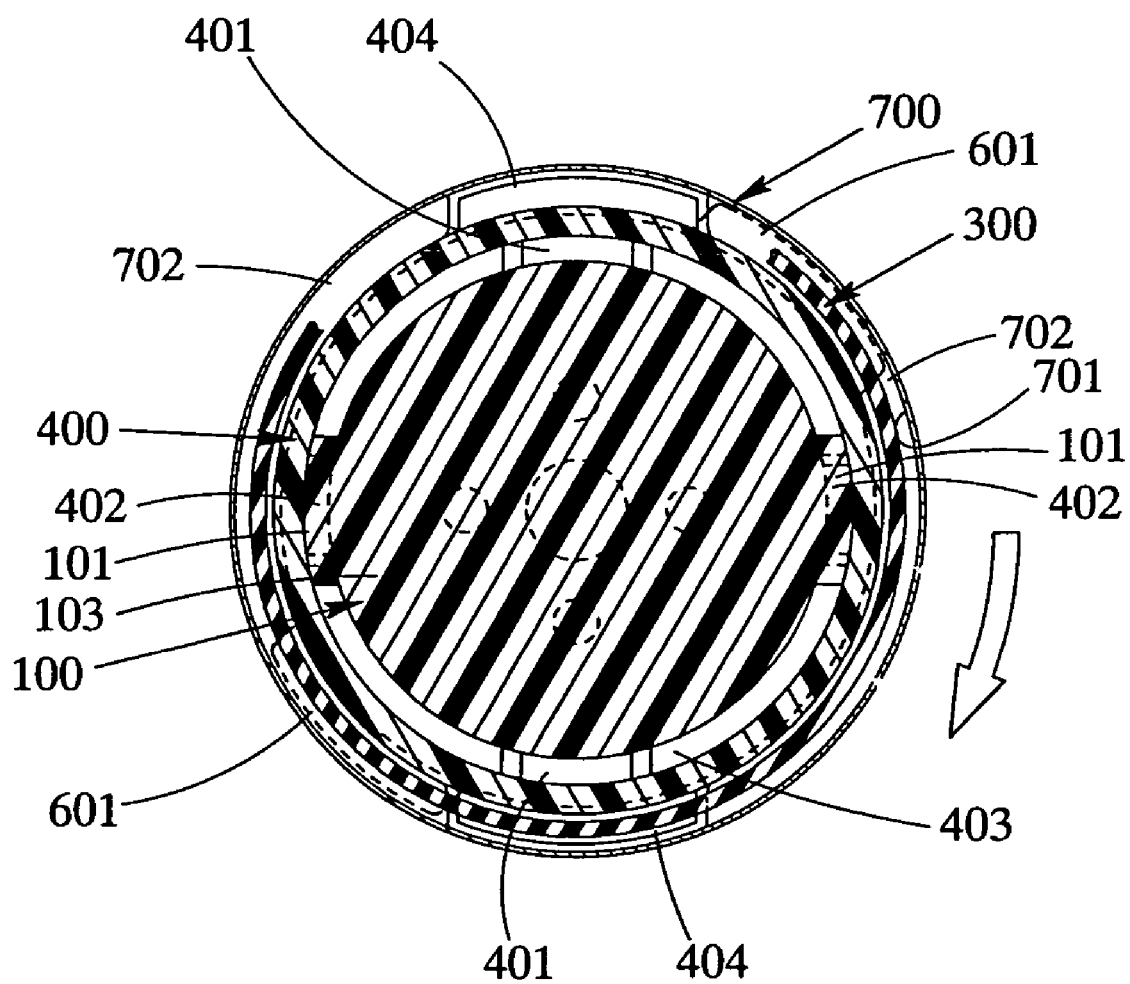
FIG. 15 is a sectional view taken along the line I-I in FIG. 12.

When the fuel cap securing operation reaches the securing-finished stage, the maintaining of a stable air-tightness by the seal ring 300 becomes important now. Therefore, when the fuel cap securing operation reaches the securing-finished stage as seen in FIG. 12, the engagement member 600 wholly reaches a position below the ribs 702 as seen in FIG. 14, and the stopper projections 101 of the closure body 100 combined with the engagement member 600 into a unitary structure can be fitted (refer to FIG. 16) again into the finishing stopper recesses 402 of the sleeve 400. As a result, the sleeve 400 is lifted by the force of the coiled spring 500, and the upper annular edge 302 of the seal ring 300 is held tightly by the lower surface of the lower step 132 of the head portion 102 of the closure body 100 and the upper edge of the sleeve 400.

Figure 13:
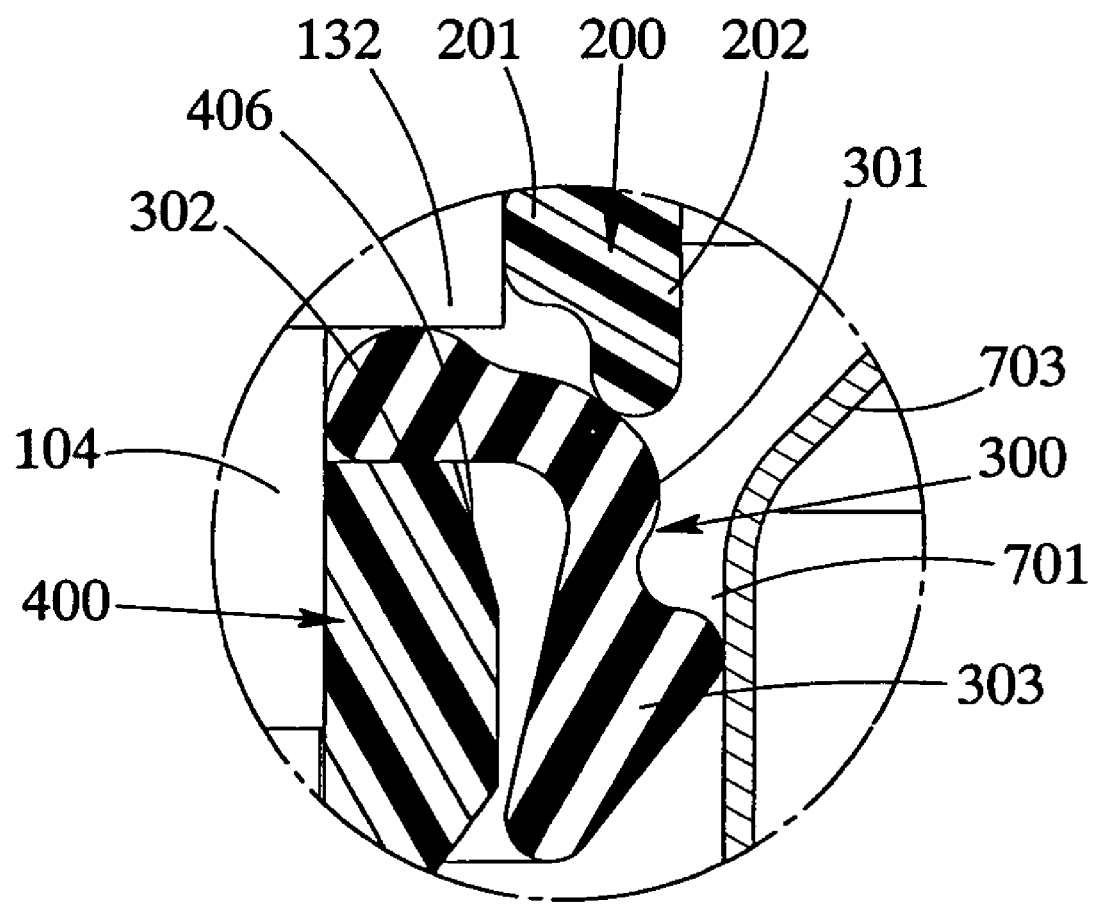
FIG. 13 is an enlarged view of the encircled portion designated by an arrow G in FIG. 12.

When the outer diameter of the lower annular edge 303 is set larger than the inner diameter of the inner side surface 701 of the oil filler port 700 in this embodiment, the frustum seal surface 301 can naturally be deformed elastically in the stage in which the lower annular edge 303 is fitted in the oil filler port 700, and a restoring force can thereby be generated. However, it is necessary that the restoring force be set in the direction in which the lower annular edge 303 is pressure-contacted with the inner side surface 701 of the oil filler port 700 for the purpose of securing the air-tightness of the fuel cap. As seen in FIG. 13, the holding of the upper annular edge 302 by the lower surface of the lower step 132 of the head portion 102 of the closure body 100 and the upper edge of the sleeve 400 signifies the creating of the condition in which the lower annular edge 303 is pressure-contacted with the inner side surface 701 of the oil filler port 700 by determining the origin of the restoring force, and generating the restoring force in the radially outward direction in accordance with the inclination of the frustum seal surface 301. In this embodiment, restrictions are placed on the frustum seal surface 301 by the retainer ring 200 so that the elastic deformation thereof does not cause the same to project upward. Therefore, the restoring force reliably causes the lower annular edge 303 to be pushed out in the radially outward direction, and the pressure-contacting of the lower annular edge 303 with the inner side surface 701 of the oil filler port 700 is thereby attained.

As is clear from the results of a comparison between FIG. 3, FIG. 8 and FIG. 12, the seal ring 300 in the fuel cap 1 in this embodiment is engaged or pressure-contacted constantly at the lower annular edge 303 with the inner side surface 701 of the oil filler port 700 from the securing-started stage (refer to FIG. 3) to the securing-finished stage (refer to FIG. 12). Especially, between the securing-intermediated stage (refer to FIG. 8) and the securing-finished stage (refer to FIG. 12), the lower annular edge 303 is pressure-contacted with the inner side surface 701 of the vertically extending oil filler port 700 by the restoring force generated due to the elastic deformation of the frustum seal surface 301. Therefore, even when the seal ring 300 is somewhat inclined, i.e., even when the fuel cap 1 is twisted, the air-tightness of the fuel cap is not spoiled. Thus, the air-tightness of the fuel cap 1 according to the present invention is attained by pressure-contacting the lower annular edge 303 in radius direction from the center thereof with the inner side surface 701 of the oil filler port 700, and this enables to prevent a decrease in the air-tightness of the fuel cap occurring when the fuel cap 1 is twisted.

Moreover, the depth of the finishing stopper recesses 402 in this embodiment is relatively large with respect to that of the starting stopper recesses 401. To be concrete, the depth of the finishing stopper recesses 402 is set substantially equal to the projecting amount of the stopper projections 101. Therefore, when the stopper projections 101 once fit in the finishing stopper recesses 402, the stopper projections 101 become difficult to disengage therefrom as compared with a case where the stopper projections 101 fit in the starting stopper recesses, so that the securing-finished stage is maintained easily. This brings about the stability of the air-tightness of the fuel cap in the securing-finished stage. When the fuel cap 1 is thus secured accurately to the oil filler port 700, the air-tightness of the fuel cap is displayed stably, and the necessary and sufficient air-tightness thereof can be displayed even if the fuel cap 1 should be twisted.

In the fuel cap 1 (refer to FIG. 1 and FIG. 2) of the previously-described embodiment, a coiled spring 500 elastically supporting a sleeve 400 moves slidingly with respect to an engagement member 600, and the slewing motion of the engagement member 600 is not transmitted to a sleeve 400. However, strictly speaking, a lower end of the coiled spring 500 is contacted with the engagement member 600 that turns, and an upper end of the coiled spring 500 is contacted with the sleeve 400 fixed its position. Therefore, there is the possibility that the amount of lifting the sleeve 400 in the securing-finished stage becomes insufficient since at least a small twisting force is exerted on the coiled spring 500. The fuel cap 4 of this embodiment is provided with the coiled spring 500 between an upper sleeve 411 and a lower sleeve 412, and the function absorbing the slewing motion is thereby removed from the coiled spring 500. The function of the coiled spring is strictly limited to the function of pressing the upper sleeve 411 toward the lower sleeve 412 so as to engage stopper projections 101 with starting stopper recesses 401 or finishing stopper recesses 402.

Figure 17:
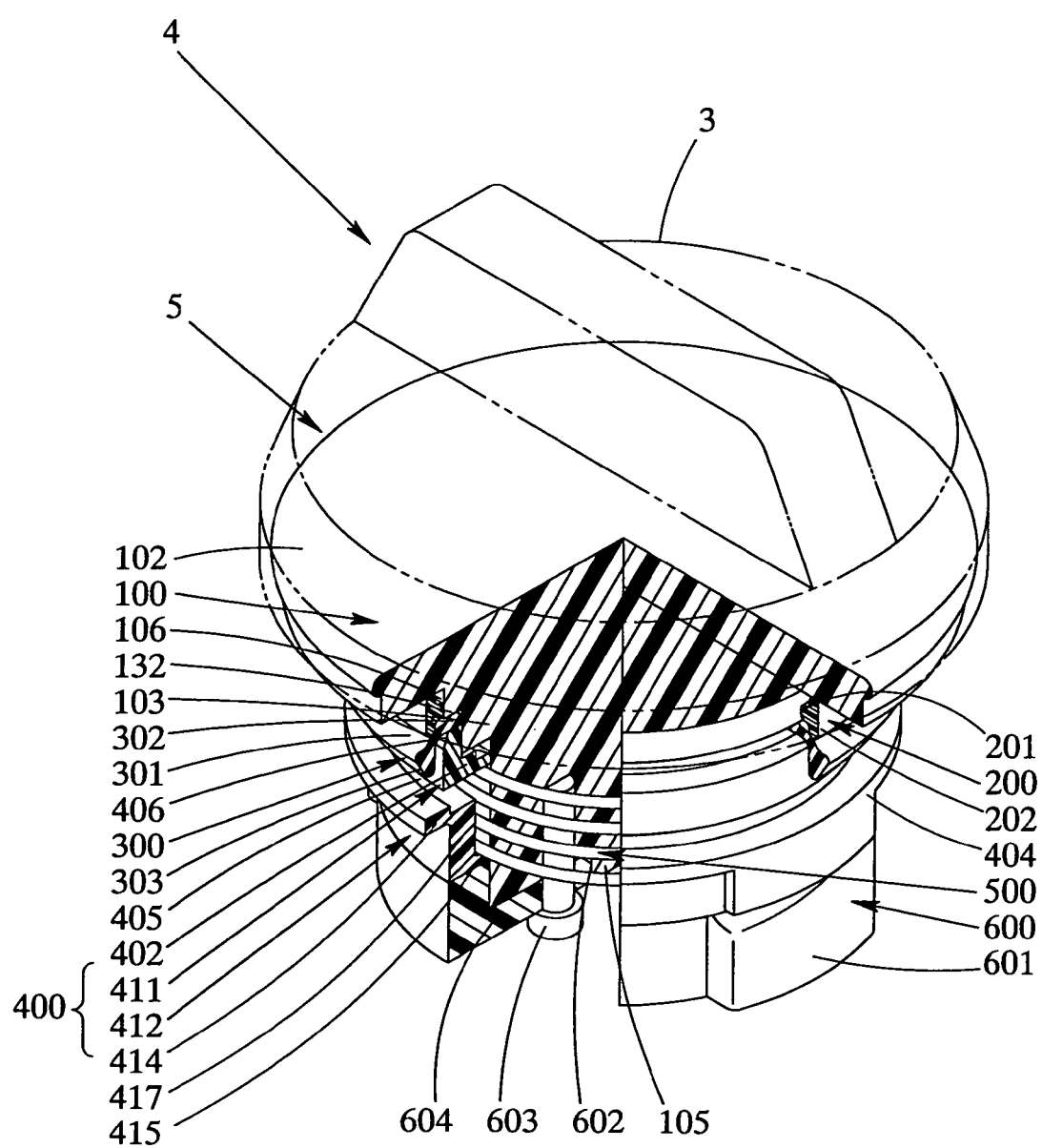
FIG. 17 is a partially cutaway perspective view of another example of the fuel cap having an upper sleeve and a lower sleeve.
Figure 18:
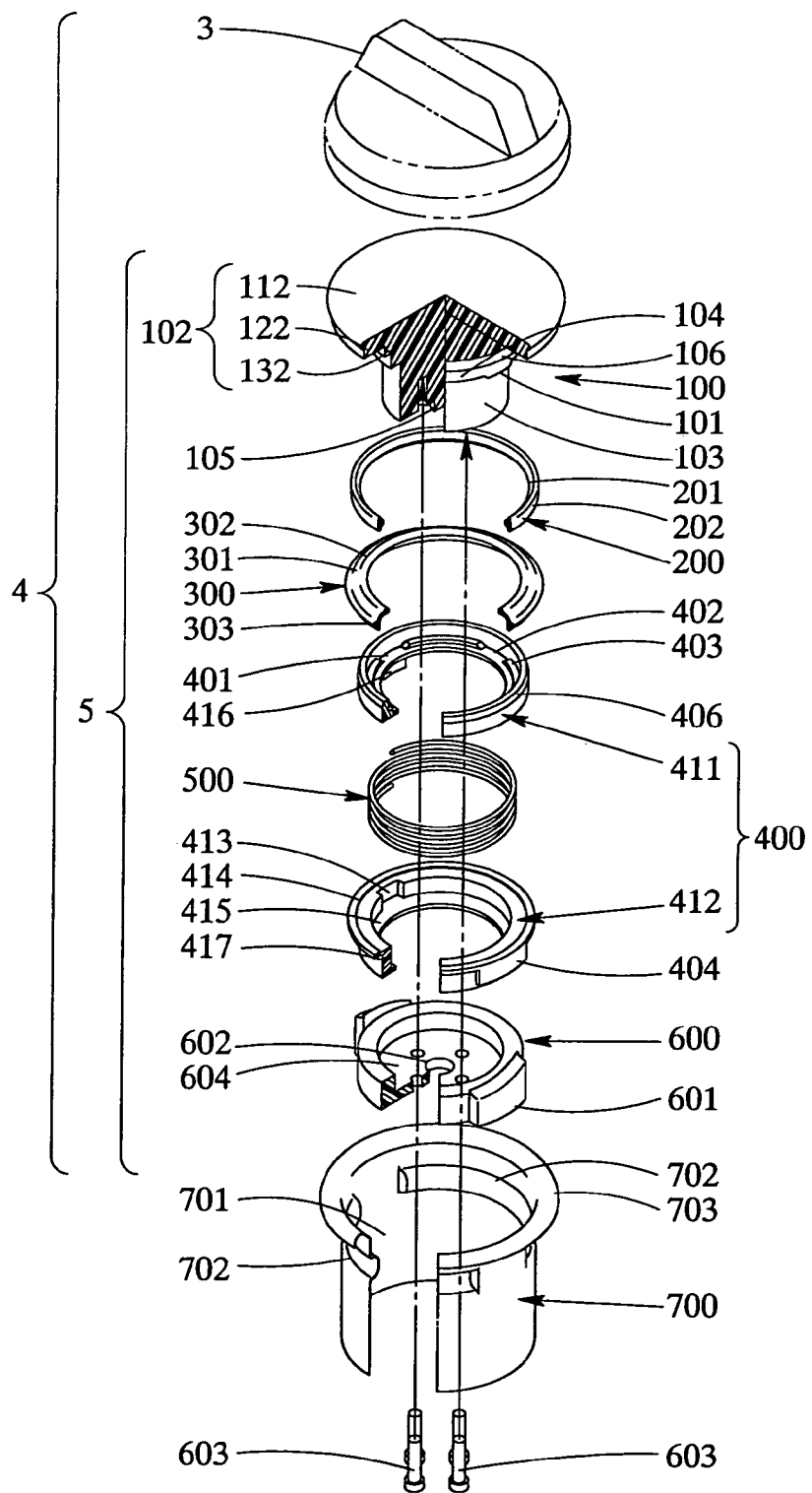
FIG. 18 is a partially cutaway exploded perspective view of the same example of the fuel cap in FIG. 17.

The construction of the fuel cap 4 of this embodiment will now be described mainly on the sleeve 400 constituting a difference between this embodiment and the previous embodiment mentioned above. The sleeve 400 includes two members, i.e. an upper sleeve 411 and a lower sleeve 412 as seen in FIG. 17 and FIG. 18. The lower sleeve 412 is a cylindrical member made of a resin having connecting recesses 413 opened upwardly of a rectangular shape in front elevation in an inner side surface thereof; anti-rotation projections 404 extending downwardly on an outer side surface thereof, adapted to be fitted in clearances between ribs 702, 702 and having a rectangular shape in front elevation; engagement flanges 414 in outward radius direction formed on an upper edge thereof, engaged from the upper side with the ribs 702 provided on the inner side surface 701 of the oil filler port 700; and an annular receiving surface 415 formed on a lower edge of the inner side surface in inward radius direction. The coiled spring 500 is supported on the annular receiving surface 415, and guided by a lower sleeve guide surface 417 upwardly extended from this annular receiving surface 415. This lower sleeve 412 only brings a lower surface of the annular receiving surface 415 into sliding contact with an upper surface of the engagement member 600, and does not have connecting relation with the engagement member 600. The upper sleeve 411 is provided on the inner side surface thereof with an annular sleeve surface 403 having stopper recesses 401, 402 opened upwardly of an inverted frustum shape in front elevation into which the stopper projections 101 of a closure body 100 are fitted, and on the outer side surface thereof with connecting projections 416 extending toward the lower sleeve 412 and similar to the shape of connecting recesses 413 into which the connecting projections are fitted.

The lower sleeve 412 is fixed its position in the turning direction by fitting the anti-rotation projections 404 thereof in the clearances between the ribs 702, 702. The fitting of the anti-rotation projections 404 into the clearances between the ribs 702, 702 is maintained by the engagement flanges 414 engaged from the upper side with the ribs 702 of the oil filler port 700. Thus, the engagement flanges 414 provided on the lower sleeve 412 have the function of restricting a position to which the lower sleeve 412 moves down, so as to reliably fit the anti-rotation projections 404 into the clearances between the ribs 702, 702. The upper sleeve 411 is fixed its position with respect to the lower sleeve 412 in the turning direction by inserting from the above the connecting projections 416 into the connecting recesses 413 of the lower sleeve 412. The upper sleeve 411 can be vertically moved close to and away from the lower sleeve 412 by inserting and withdrawing the connecting projections 416 into and from the connecting recesses. As a result, the upper sleeve 411 is elastically supported in the upward direction by the coiled spring 500 interposed between the upper surface of the receiving annular surface 415 of the lower sleeve 412 and the lower surface of the annular sleeve surface 403 of the upper sleeve 411, and thereby deformed freely in the vertical direction only.

Figure 19:
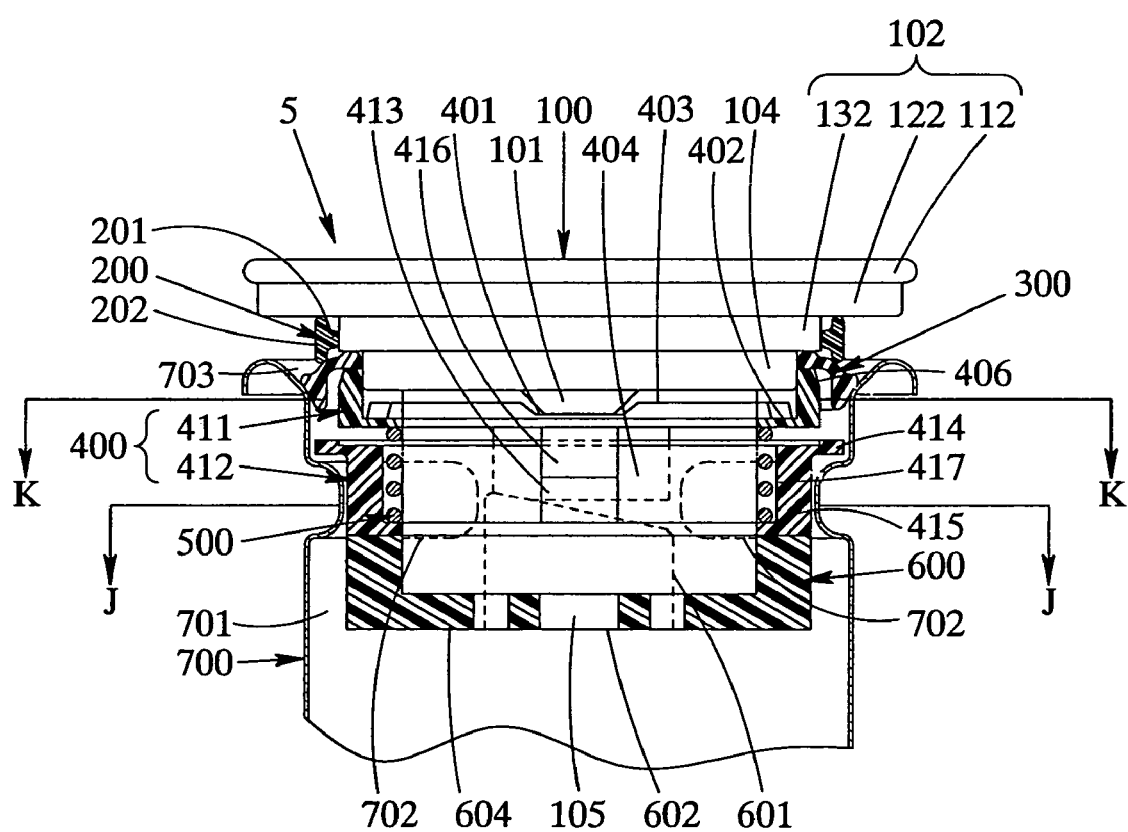
FIG. 19 is a longitudinal sectional view showing the securing-started stage of the same fuel cap in FIG. 17.
Figure 20:
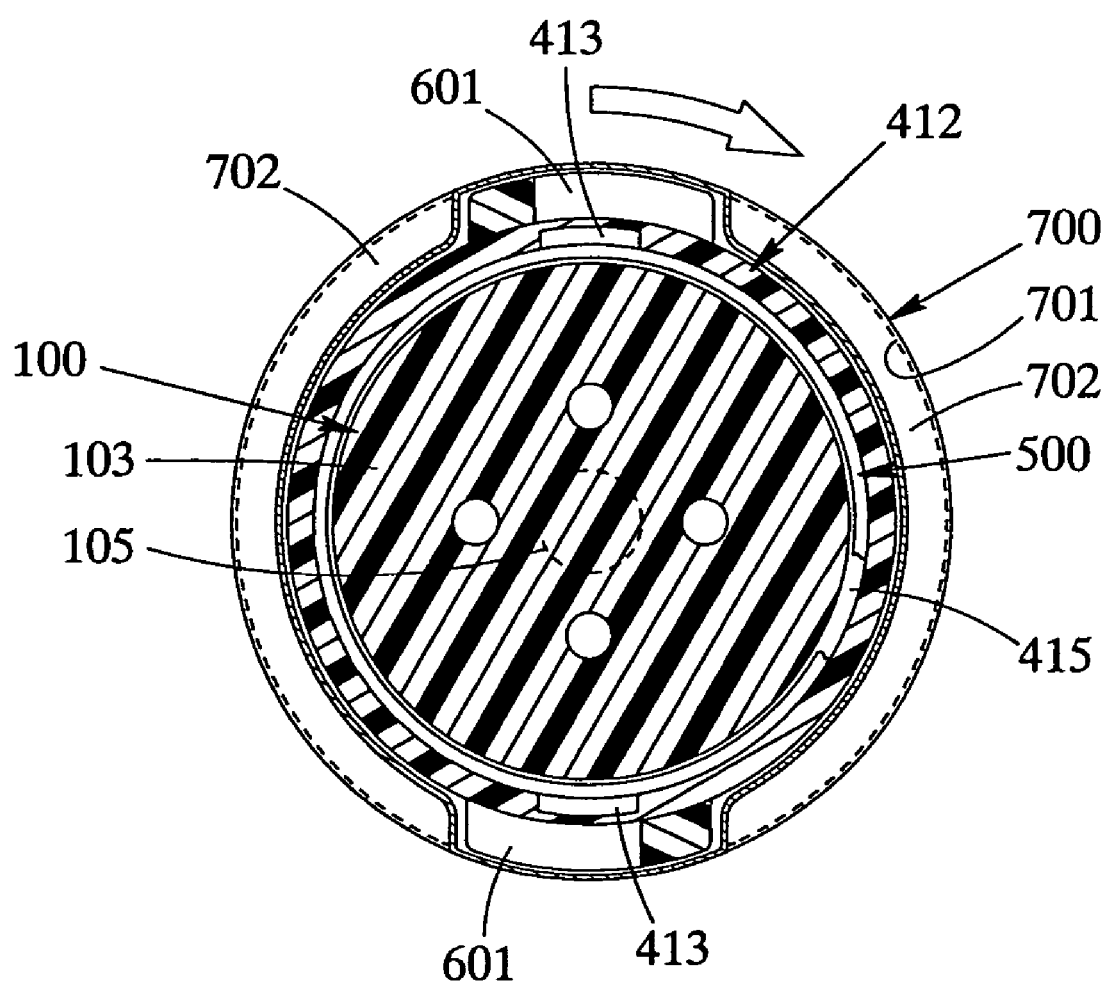
FIG. 20 is a sectional view taken along the line J-J in FIG. 19.
Figure 21:
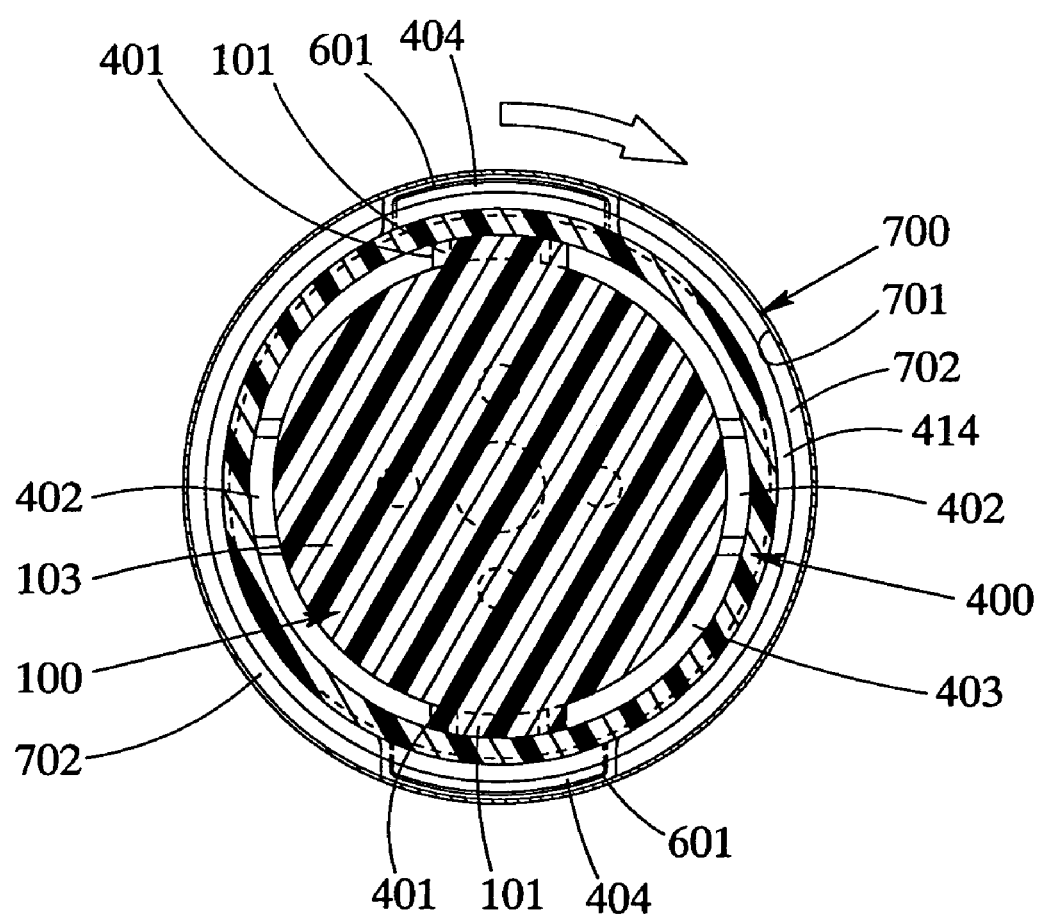
FIG. 21 is a sectional view taken along the line K-K in FIG. 19.

The fuel cap 4 of this embodiment is secured to the oil filler port 700 in the following order. First, in the securing-started stage in which the fuel cap 4 is inserted into the oil filler port, a closure 5 is fitted into an end of the oil filler port 700 as seen in FIG. 19, by inserting the engagement projections 601 of the engagement member 600 into the clearances between the ribs 702, 702 of the oil filler port 700. The engagement projections 601 of the engagement member 600 pass through the clearances between the ribs 702, 702 as seen in FIG. 20, and are positioned at the downwardly inclined upper surface thereof under the ribs 702. On the other hand, the lower sleeve 412 is not engaged at the engagement flanges 414 thereof with the ribs 702 as seen in FIG. 21 but the anti-rotation projections 404 thereof are filled in the clearances between the ribs 702, 702 by contacting the lower surface of the receiving annular surface 415 with the upper surface of the engagement member 600. Thus, the lower sleeve 412 is fixed its position relatively with respect to the closure body 100 and the engagement member 600. Also, the upper sleeve 411 is fitted at the connecting projections 416 into the connecting recesses 413 of the lower sleeve 412, and then restricted its position in the turning direction in accordance with the lower sleeve 412.

Figure 22:
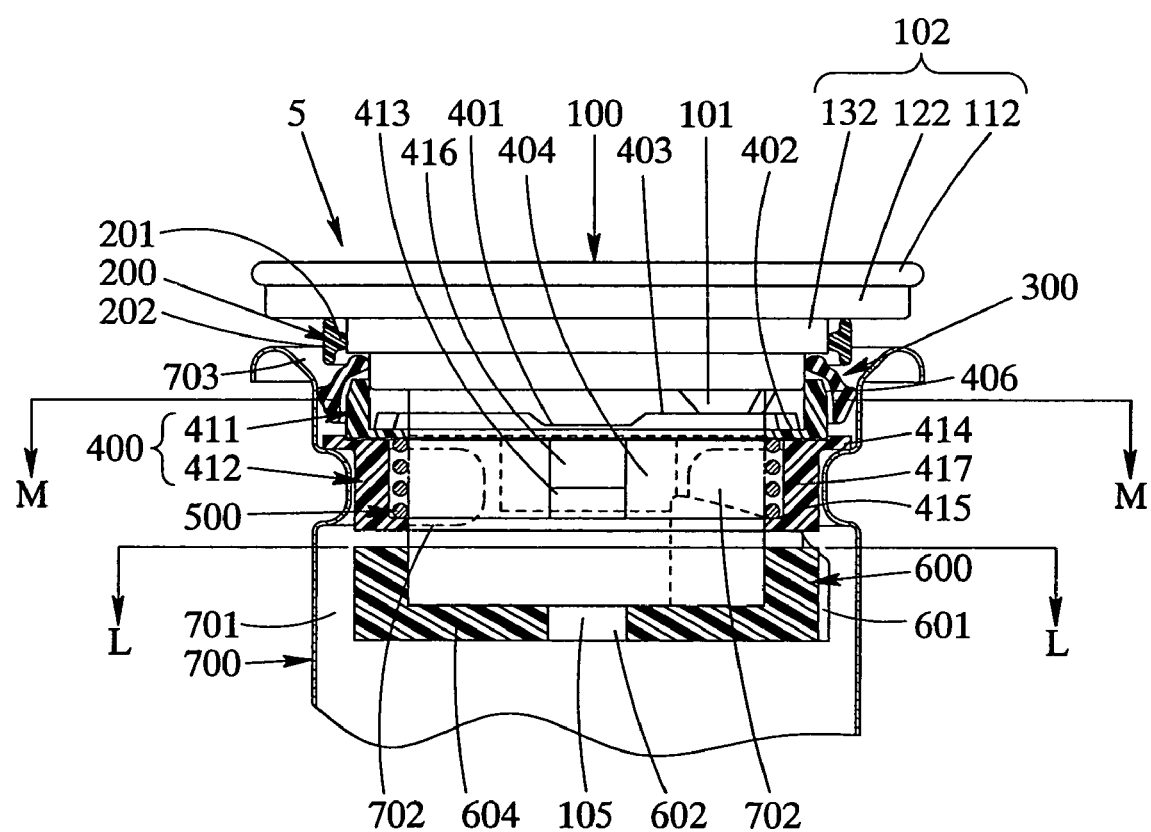
FIG. 22 is a longitudinal sectional view showing a securing-intermediated stage of the same fuel cap in FIG. 17.
Figure 23:
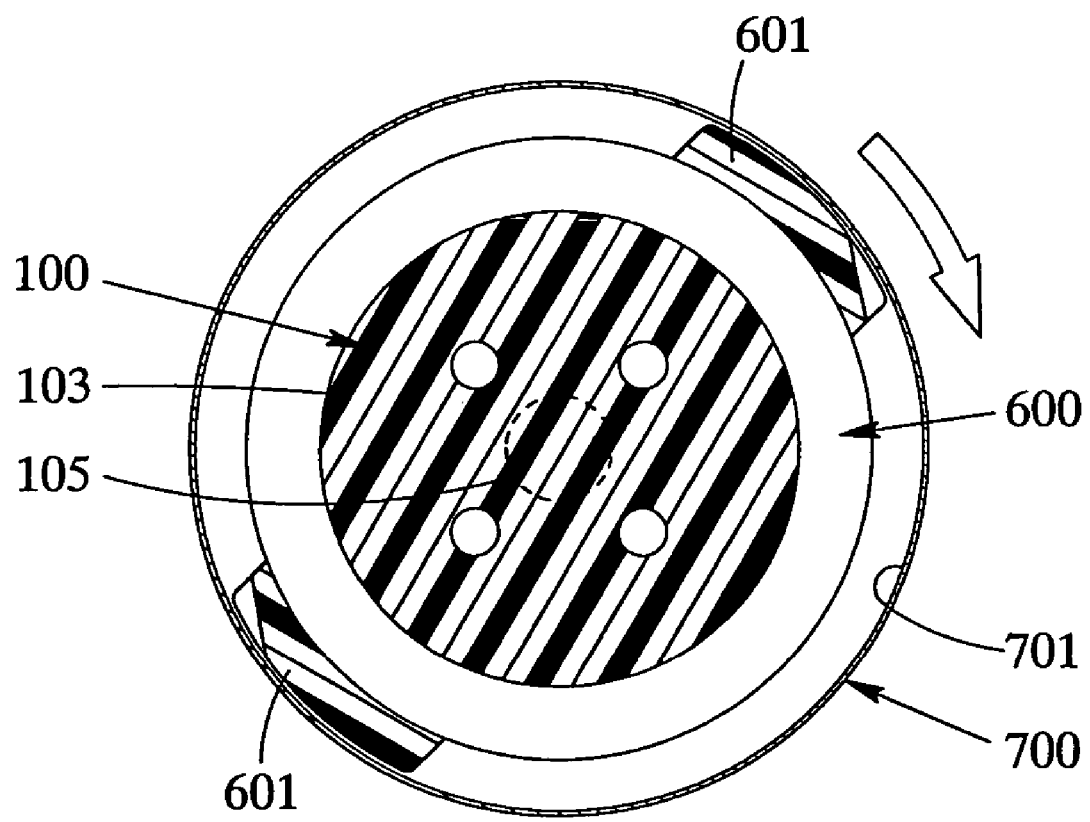
FIG. 23 is a sectional view taken along the line L-L in FIG. 22.
Figure 24:
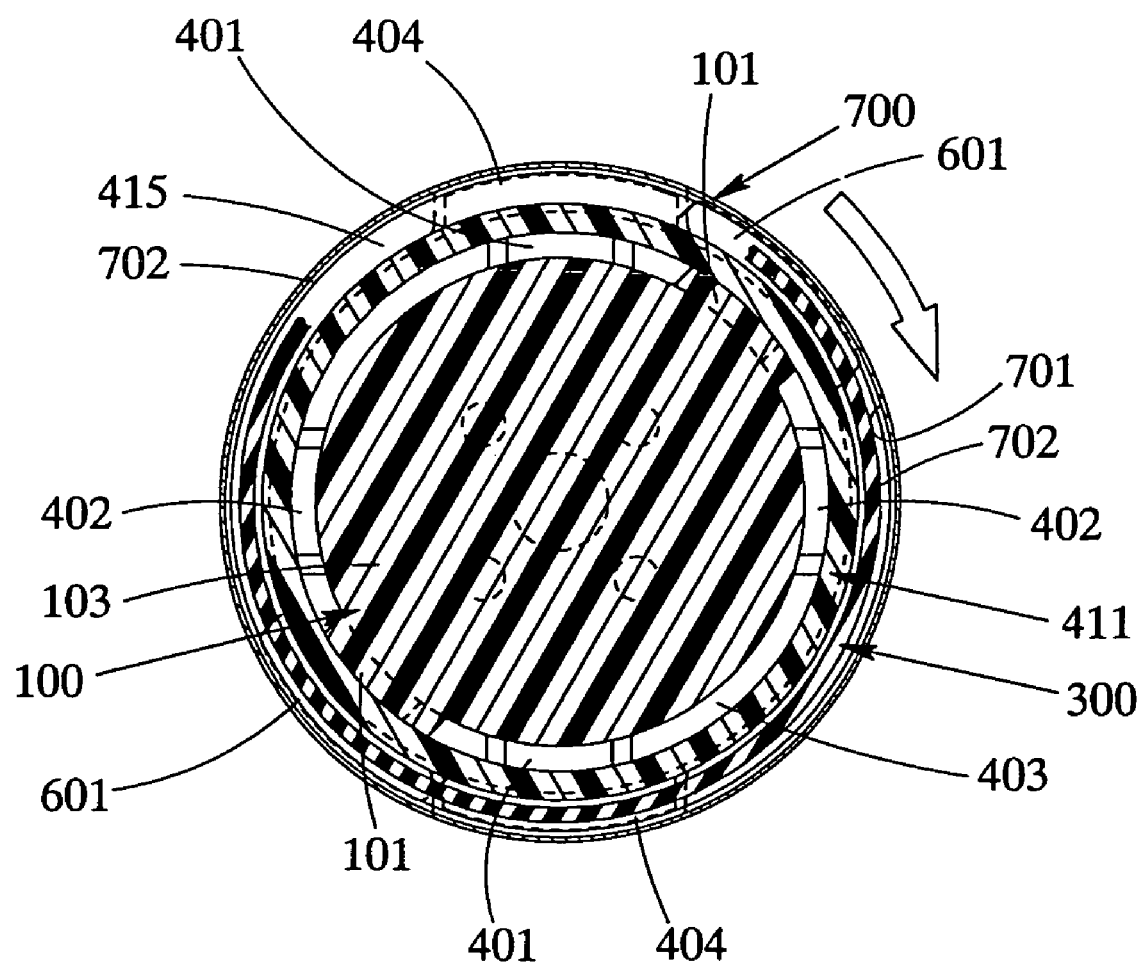
FIG. 24 is a sectional view taken along the line M-M in FIG. 22.

In the securing-intermediated stage in which the closure body 100 starts being turned, the upper edge of the upper sleeve 411 stays away from the lower surface of the lower step 132 of the head portion 102 of the closure body 100 as seen in FIG. 22, so that an amount of the tightness between the closure body 100 and seal ring 300 is temporarily reduced. To be concrete, the closure body 100 drops down with the engagement member 600 which the engagement projections 601 are slid in the clearances between the ribs 702, 702, as seen in FIG. 23. However, in the same time, the lower sleeve 412 with the anti-rotation projections 404 fitted in the clearances between the ribs 702, 702 is fixed its position as seen in FIG. 24. Thus, the stopper projections 101 of the closure body 100 run around the annular sleeve surface 403 to thereby relatively press down the upper sleeve 411. As a result, the tightness of the seal ring 300 held by the lower surface of the lower step 132 of the head portion 102 of the closure body 100 and the upper edge of the upper sleeve 411 is reduced due to the relative pressing force of the upper sleeve 411. During this time, the slewing motion of the engagement member 600 is absorbed owing to the sliding contact of the lower sleeve 412 with the annular receiving surface 415, and not transmitted to the coiled spring 500. Therefore, there is not a fear of the occurrence of the twisting of the coiled spring 500.

Figure 25:
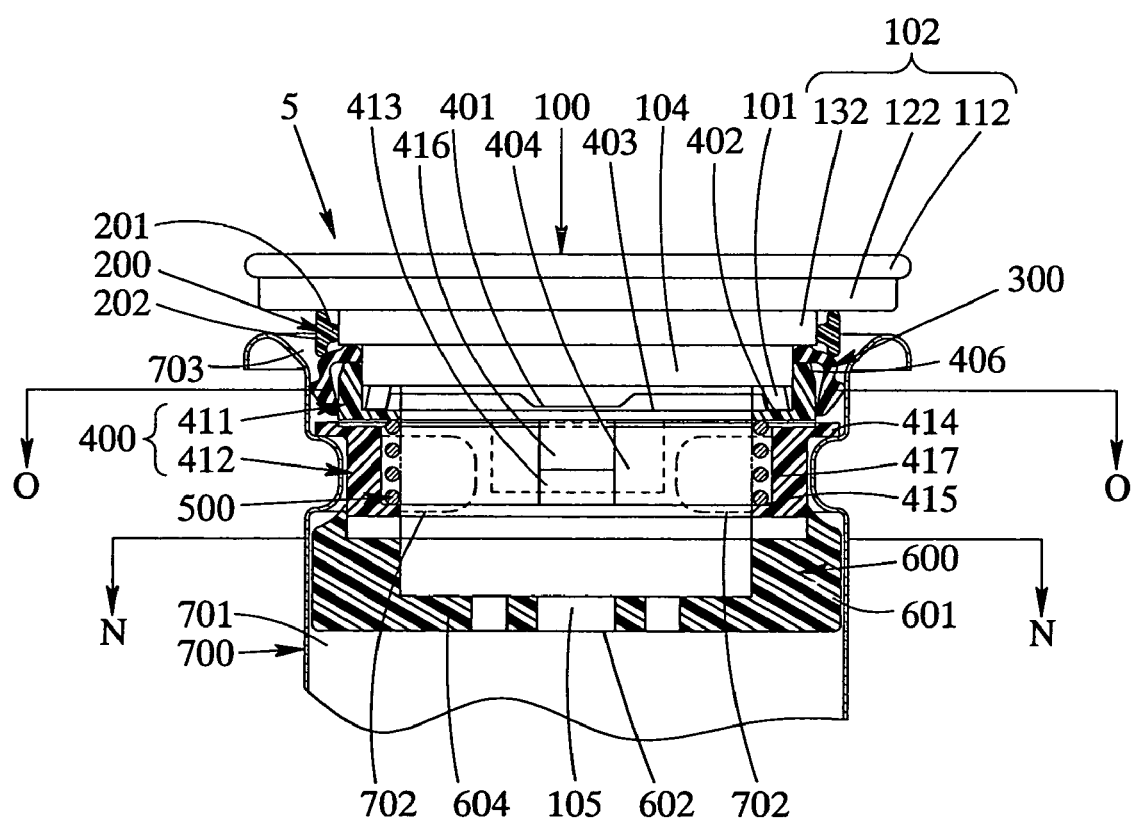
FIG. 25 is a longitudinal sectional view showing the securing-finished stage of the same fuel cap in FIG. 17.
Figure 26:
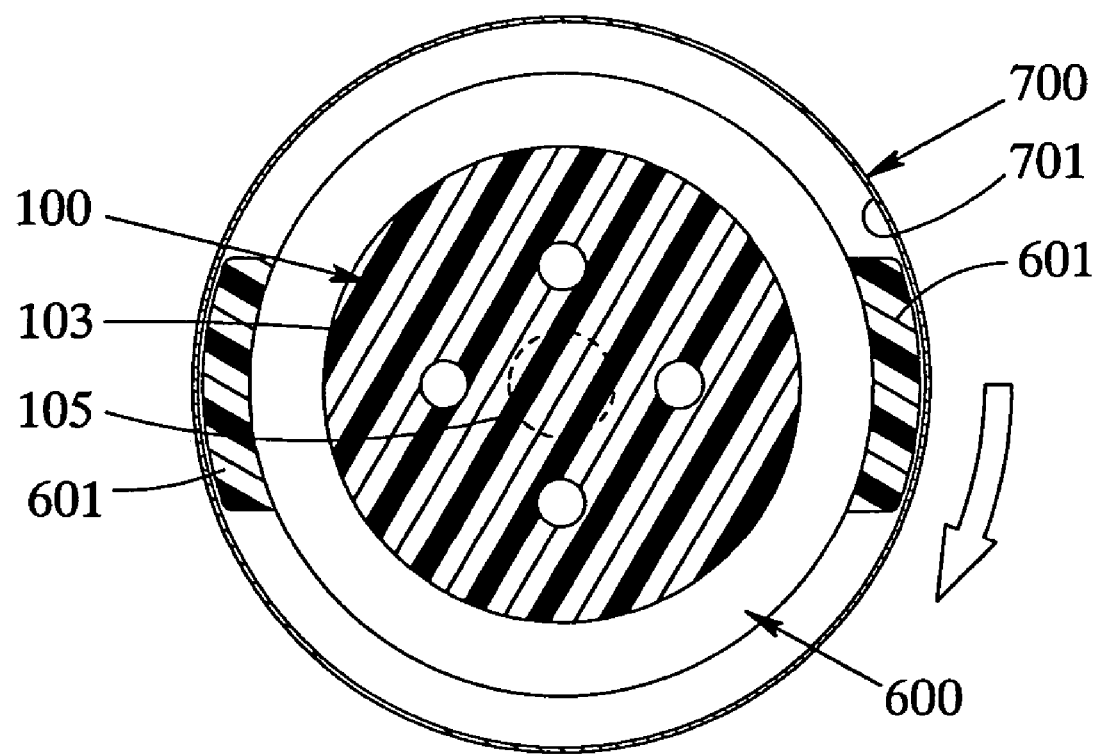
FIG. 26 is a sectional view taken along the line N-N in FIG. 25.
Figure 27:
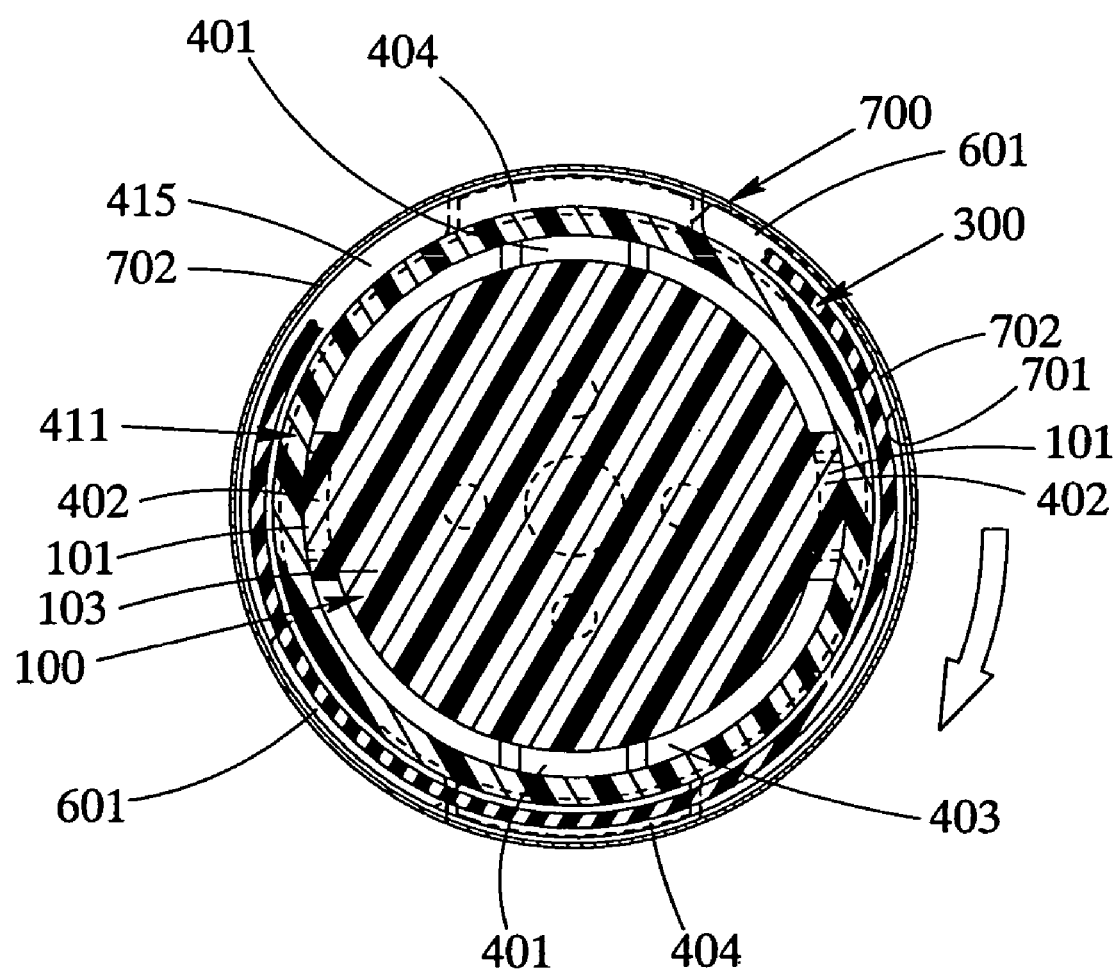
FIG. 27 is a sectional view taken along the line O-O in FIG. 25.

When the fuel cap securing operation reaches the securing-finished stage thereof as seen in FIG. 25, the engagement member 600 wholly reaches a position below the ribs 702 as seen in FIG. 26, and the stopper projections 101 of the closure body 100 fixed with the engagement member 600 into a unitary structure can be fitted again into the finishing recesses 402 of the upper sleeve 411 as seen in FIG. 27. Therefore, the upper sleeve 411 can be lifted by the urging force of the coiled spring 500, and the upper annular edge 302 of the seal ring 300 can be held tightly by the lower surface of the lower step 132 of the head portion 102 of the closure body 100 and the upper edge of the upper sleeve 411. In this embodiment, the coiled spring 500 is not twisted since the coiled spring 500 does not have influence of the slewing motion of the engagement member 600. The coiled spring 500 can lift the upper sleeve 411 reliably by a level corresponding to the loss of a pressing force owing to the engagement of the stopper projections 101 with the finishing stopper recesses 402. Thus, the seal ring 300 is held tightly at the upper annular edge 302 of the lower surface of the lower step 132 of the head portion 102 of the closure body 100 and the upper edge of the upper sleeve 411.

What is claimed is:

1. A fuel cap comprising a closure to be secured in an oil filler port attached to an inlet of a feed oil pipe, and a handle for turning the closure, the oil filler port being provided on an inner side surface thereof with a plurality of circumferentially extending ribs intermittently, the closure including:
a closure body having a head portion to be turned, a trunk portion extending downward from the head portion, and an annular trunk surface with downwardly extending stopper projections formed on a side surface of the trunk portion,
a seal ring which is fitted around the trunk portion so that the seal ring is fitted between a lower surface of the head portion and an upper portion of the annular trunk surface, and which pressure-contacts with an inner side surface of the oil filler port in radius direction from an inner side thereof, a sleeve with annular shape having on an inner side surface thereof an annular sleeve surface provided with stopper recesses into which the stopper projections are fitted, and on an outer side surface thereof downwardly extending anti-rotation projections which are fitted in clearances between the ribs, and adapted to lift up the seal ring, a coiled spring urging the sleeve upward, and an engagement member having engagement projections adapted to be turned through the clearances between the ribs of the oil filler port and thereby engaged with the ribs from a lower side thereof, and formed by integrally assembling these parts in the mentioned order;

the holding of the seal ring by the lower surface of the head portion of the closure body and an upper surface of the sleeve becoming:

tight when the stopper projections of the closure body are fitted in the stopper recesses to cause the sleeve to be lifted by a force of the coiled spring, and loose when the stopper projections are disengaged from the stopper recesses and run on the annular sleeve surface to cause the sleeve to be pressed down against the force of the coiled spring.

2. The fuel cap according to claim 1, wherein the stopper recesses of the sleeve are provided on the annular sleeve surface in the circumferential positions corresponding to a securing-started stage and a securing-finished stage respectively, and the engagement projections of the engagement member are provided on an outer side surface of the engagement member in the circumferential positions corresponding to the securing-started stage.

3. The fuel cap according to claim 2, wherein the sleeve has the annular sleeve surface inclining downward from the stopper recesses provided thereon in the circumferential positions corresponding to the securing-started stage toward the stopper recesses provided thereon in the circumferential positions corresponding to the securing-finished stage, and thereby carrying out the reliable turning operation of the fuel cap in closing direction by utilizing smooth movement of the stopper projections of the closure body on the annular sleeve surface.

4. The fuel cap according to claim 2, wherein the sleeve has the annular sleeve surface inclining downward from the stopper recesses provided thereon in the circumferential positions corresponding to the securing-finished stage toward the stopper recesses provided thereon in the circumferential positions corresponding to the securing-started stage, and thereby carrying out the reliable turning operation of the fuel cap in opening direction by utilizing smooth movement of the stopper projections of the closure body on the annular sleeve surface.

5. The fuel cap according to claim 2, wherein:

the depth of the stopper recesses of the sleeve provided in the circumferential positions corresponding to the securing-started stage is set relatively small, the depth of the stopper recesses of the sleeve provided in the circumferential positions corresponding to the securing-finished stage is set relatively large, and thereby carrying out the easiness of the disengaging of the stopper projections from the stopper recesses in the securing-started stage while maintaining the tight holding force of the seal ring obtained at the securing-finished stage.

6. The fuel cap according to claim 1, wherein the seal ring includes an upper annular edge to be fitted firmly around the trunk portion of the closure body, a lower annular edge diverging from the upper annular edge, and a frustum seal surface connecting the upper annular edge and the lower annular edge together and inclined downward in the outward radius direction, the upper surface of the sleeve and the lower surface of the head portion of the closure body holding therebetween the upper annular edge of the seal ring in the vertical direction.

7. The fuel cap according to claim 6, wherein the sleeve has a frustum surface inclined downward from the upper surface thereof at an angle smaller than the angle of inclination of the frustum seal surface of the seal ring and extending in the outer circumferential direction thereof, and the upper surface of the sleeve and the lower surface of the head portion of the closure body holding therebetween the upper annular edge of the seal ring in the vertical direction.

8. The fuel cap according to claim 6, wherein the upper annular edge of the seal ring is substantially horseshoe-shaped in the cross section thereof, and the upper surface of the sleeve and the lower surface of the head portion of the closure body holding therebetween the upper annular edge of the seal ring in the vertical direction.

9. The fuel cap according to claim 1, wherein the sleeve includes a lower sleeve and an upper sleeve, the lower sleeve having connecting recesses opening upwardly arranged to the inner side surface thereof, anti-rotation projections extending downwardly arranged to the outer side surface thereof so as to fit into clearances between the ribs, and engagement flanges extending radially outward engaged with the ribs, the upper sleeve having the annular sleeve surface arranged to the inner side surface thereof with the stopper recesses opening upwardly to receive the stopper projections, and connecting projections extending toward the lower sleeve arranged to the outer side surface thereof so as to fit into the connecting recesses, the closure is assembled integrally by the closure body, the seal ring, the upper sleeve, the coiled spring, the lower sleeve and the engagement member in the mentioned order;

the holding of the seal ring by the lower surface of the head portion of the closure body and the upper surface of the upper sleeve becoming:

tight when the stopper projections of the closure body are fitted in the stopper recesses of the upper sleeve to cause the upper sleeve to be lifted by a force of the coiled spring, and loose when the stopper projections are disengaged from the stopper recesses and run on the annular sleeve surface to cause the upper sleeve to be pressed down against the force of the coiled spring.

10. The fuel cap according to claim 1, wherein:

the head portion of the closure body has a multi-step structure, the seal ring fitted around the trunk portion so that the seal ring is fitted between a lower surface of a lower step of the head portion and the annular trunk surface, and a retainer ring interposed between the frustum seal surface of the seal ring and the lower surface of the upper step of the head portion.

11. The fuel cap according to claim 10, wherein the stopper recesses of the sleeve are provided on the annular sleeve surface in the circumferential positions corresponding to the securing-started stage and the securing-finished stage respectively, and the engagement projections of the engagement member are provided on the outer side surface of the engagement member in the circumferential positions corresponding to the securing-started stage.

12. The fuel cap according to claim 11, wherein the sleeve has the annular sleeve surface inclining downward from the stopper recesses provided thereon in the circumferential positions corresponding to the securing-started stage toward the stopper recesses provided thereon in the circumferential positions corresponding to the securing-finished stage, and thereby carrying out the reliable turning operation of the fuel cap in closing direction by utilizing smooth movement of the stopper projections of the closure body on the annular sleeve surface.

13. The fuel cap according to claim 11, wherein the sleeve has the annular sleeve surface inclining downward from the stopper recesses provided thereon in the circumferential positions corresponding to the securing-finished stage toward the stopper recesses provided thereon in the circumferential positions corresponding to the securing-started stage, and thereby carrying out the reliable turning operation of the fuel cap in opening direction by utilizing smooth movement of the stopper projections of the closure body on the annular sleeve surface.

14. The fuel cap according to claim 11, wherein:

the depth of the stopper recesses of the sleeve provided in the circumferential positions corresponding to the securing-started stage is set relatively small, the depth of the stopper recesses of the sleeve provided in the circumferential positions corresponding to the securing-finished stage is set relatively large, and thereby carrying out the easiness of the disengaging of the stopper projections from the stopper recesses in the securing-started stage while maintaining the tight holding force of the seal ring obtained at the securing-finished stage.

15. The fuel cap according to claim 10, wherein the seal ring includes the upper annular edge to be fitted firmly around the trunk portion of the closure body, the lower annular edge diverging from the upper annular edge, and the frustum seal surface connecting the upper annular edge and the lower annular edge together and inclined downward in the outward radius direction, the upper annular edge being held by the upper surface of the sleeve and the lower surface of the lower step of the head portion of the closure body, the lower annular edge pressure-contacting the outer circumferential surface thereof with the inner side surface of the oil filler port in radius direction from the center thereof, and the retainer ring including:

an inner circumferential retainer portion fitted firmly around the side surface of the lower step of the head portion, an outer circumferential retainer portion contacted to the lower surface of the upper step of the head portion with an upper edge thereof and to the frustum seal surface with a lower edge thereof respectively, and thereby pressing the frustum seal surface of the seal ring from the upper side thereof by the outer circumferential retainer portion.

16. The fuel cap according to claim 15, wherein the sleeve has a frustum surface inclined downward from the upper surface thereof at an angle smaller than the angle of inclination of the frustum seal surface of the seal ring and extending in the outer circumferential direction thereof, and the upper surface of the sleeve and the lower surface of the lower step of the head portion of the closure body holding therebetween the upper annular edge of the seal ring in the vertical direction.

17. The fuel cap according to claim 15, wherein:

the upper annular edge of the seal ring is substantially horseshoe-shaped in the cross section thereof, and the upper surface of the sleeve and the lower surface of the lower step of the head portion of the closure body holding therebetween the upper annular edge of the seal ring in the vertical direction.

18. The fuel cap according to claim 10, wherein the sleeve includes the lower sleeve and the upper sleeve, the lower sleeve having connecting recesses opening upwardly arranged to the inner side surface thereof, anti-rotation projections extending downwardly arranged to the outer side surface thereof so as to fit into clearances between the ribs, and engagement flanges extending radially outward engaged with the ribs, the upper sleeve having the annular sleeve surface arranged to the inner side surface thereof with the stopper recesses opening upwardly to receive the stopper projections, and connecting projections extending toward the lower sleeve arranged to the outer side surface thereof so as to be fit into the connecting recesses, the closure is assembled integrally by the closure body, the retainer ring, the seal ring, the upper sleeve, the coiled spring, the lower sleeve and the engagement member in the mentioned order;

the holding of the seal ring by the lower surface of the lower step of the head portion of the closure body and the upper surface of the upper sleeve becoming:

tight when the stopper projections of the closure body are fitted in the stopper recesses of the upper sleeve to cause the upper sleeve to be lifted by a force of the coiled spring, and loose when the stopper projections are disengaged from the stopper recesses and run on the annular sleeve surface to cause the upper sleeve to be pressed down against the force of the coiled spring.

* * * * *